United States Patent
Meng et al.

(10) Patent No.: US 9,495,426 B2
(45) Date of Patent: Nov. 15, 2016

(54) TECHNIQUES FOR INTERACTIVE DECISION TREES

(71) Applicant: SAS Institute, Inc., Cary, NC (US)

(72) Inventors: Xiangxiang Meng, Morrisville, NC (US); Rajendra Singh, Durham, NC (US); Xiangqian Hu, Cary, NC (US); Duane Hamilton, Cary, NC (US); Robert Wayne Thompson, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/790,731

(22) Filed: Jul. 2, 2015

(65) Prior Publication Data

US 2016/0048566 A1 Feb. 18, 2016

Related U.S. Application Data

(60) Provisional application No. 62/038,354, filed on Aug. 17, 2014.

(51) Int. Cl.
*G06F 15/18* (2006.01)
*G06F 17/30* (2006.01)
*G06N 99/00* (2010.01)

(52) U.S. Cl.
CPC ... *G06F 17/30539* (2013.01); *G06F 17/30327* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 5,724,573 A | 3/1998 | Agrawal et al. | |
| 6,278,464 B1 | 8/2001 | Kohavi et al. | |
| 6,456,619 B1 | 9/2002 | Sassin et al. | |
| 7,363,593 B1 | 4/2008 | Loyens et al. | |
| 7,873,651 B2 | 1/2011 | Ono et al. | |
| 8,838,578 B2 | 9/2014 | Yoon et al. | |
| 2006/0047640 A1* | 3/2006 | Ono | G06F 17/30398 |
| 2006/0117059 A1 | 6/2006 | Freeman, Jr. et al. | |
| 2011/0307423 A1* | 12/2011 | Shotton | G06K 9/6282 706/12 |
| 2014/0095548 A1 | 4/2014 | Chen et al. | |
| 2014/0201126 A1* | 7/2014 | Zadeh | G06K 9/627 706/52 |

FOREIGN PATENT DOCUMENTS

WO 02063469 A2 8/2002

OTHER PUBLICATIONS

Ankerst et al., "Visual Classification: An Interactive Approach to Decision Tree Construction" Institute for Computer Science, University of Munich Oettingenstr. 67, D-80538 München, Germany (1999) 5 pages.

* cited by examiner

*Primary Examiner* — Luis Sitiriche
(74) *Attorney, Agent, or Firm* — Kilpatrick Townsend & Stockton LLP

(57) ABSTRACT

Techniques for providing interactive decision trees are included. For example, a system is provided that stores data related to a decision tree, wherein the data includes one or more data structures and one or more portions of code. The system receives input corresponding to an interaction request associated with a modification to the decision tree. The system determines whether the modification requires multiple-processing iterations of the distributed data set. The system generates an application layer modified decision tree when the generating requires no multiple-processing iterations of the distributed data set. The system facilitates server layer modification of the decision tree when the modification requires multiple-processing iterations of the distributed data set. The system generates a representation of the application layer modified decision tree or the server layer modified decision tree.

44 Claims, 24 Drawing Sheets

| Application tier data structures and functions (in-memory) | |
| --- | --- |
| Tree | A data structure that represents a decision tree in the application tier. For each node, information such as response profiles, parent node, child nodes, split variable, and split rules are stored. |
| DisplayTree | A data structure generated from Tree for the tree visualization in the display tier. |
| Tree.Append | Append the sub tree generated by a server to a tree node in the current decision tree. |
| Tree.AppendWorth | Append the worth of splits table to a tree node in the current decision tree. |
| Tree.Display | Generate the display data structure DisplayTree. |
| Tree.GetPath | Return the path from the root node to a specific node. |
| Tree.GetSplitVar | Return the splitting variable and the splitting rule corresponding to a specific node in the Tree. |
| Tree.GetSubTree | Return the sub-tree structure below a specific node. |
| Tree.Next | Return the next snapshot of the Tree data structure. |
| Tree.Previous | Return the previous snapshot of the Tree data structure. |
| Tree.Remove | Remove a sub-tree structure below a specific node. |
| Tree.Save | Save the Tree data structure in memory. |
| Tree.SetSplitValue | Manually update the splitting value below a specific node. |
| Tree.UpdateSubTree | Update the sub-tree structure below a specific node. |
| Sever tier functions (in-memory) | |
| ServerTree | A data structure that represents a decision tree in the server tier. |
| ServerTree.GetWorth | Return a table of worth of splits associated with one or more candidate variables that may be used to split a specific node. |
| ServerTree.Train | Train a decision tree or sub-tree. |
| ServerTree.Update | Update a summary of statistics (per node) in a tree (or sub-tree) without changing the Tree structure. |

TECHNIQUES FOR INTERACTIVE DECISION TREES

This application claims priority to U.S. Provisional Patent Application No. 62/038,354, filed Aug. 17, 2014, entitled "A Three-Tier In-memory Architecture for Interactive Decision Tree on Large-Scale Distributed Data Sets", which is incorporated herein by reference in its entirety.

TECHNICAL FIELD

Background

Decision tree learning algorithms are vital tools for predictive modeling approaches that use statistics, data mining, and machine learning. For example, decision tree learning is commonly used in data mining to create a model that predicts the value of a target variable based on several input variables. Decision tree learning is one of the most successful techniques for supervised classification learning.

SUMMARY

In accordance with the teachings included herein, systems and methods are provided for providing interactive decision trees.

For example, a system is provided for providing interactive decision trees. The system may include one or more processors. The system may further include one or more computer readable storage mediums comprising instructions to cause the one or more processors to perform operations. The operations may include receiving, by the one or more processors, a decision tree corresponding to a distributed data set. The operations may further include storing data related to the decision tree, wherein the data includes one or more data structures and one or more portions of code. The operations may further include receiving input corresponding to an interaction request associated with a modification to the decision tree. The operations may further include determining whether the modification requires multiple-processing iterations of the distributed data set. The operations may further include generating an application layer modified decision tree when the generating requires no multiple-processing iterations of the distributed data set, wherein the application layer modified decision tree is generated using the stored data. The operations may further include facilitating server layer modification of the decision tree when the server layer modification requires multiple-processing iterations of the distributed data set, wherein facilitating the server layer modification includes transmitting information related to the interaction request and receiving a server layer modified decision tree. The operations may further include generating a representation of the application layer modified decision tree or the server layer modified decision tree.

In another example, a non-transitory computer program product, tangibly embodied in a non-transitory machine readable storage medium is provided for providing interactive decision trees. The non-transitory computer program product including instructions operable to cause a data processing apparatus to receive, by a computing device, a decision tree corresponding to a distributed data set. The computer program product may include further instructions operable to store data related to the decision tree, wherein the data includes one or more data structures and one or more portions of code. The computer program product may include further instructions operable to receive input corresponding to an interaction request associated with a modification to the decision tree. The computer program product may include further instructions operable to determine whether the modification requires multiple-processing iterations of the distributed data set. The computer program product may include further instructions operable to generate an application layer modified decision tree when the generating requires no multiple-processing iterations of the distributed data set, wherein the application layer modified decision tree is generated using the stored data. The computer program product may include further instructions operable to facilitate server layer modification of the decision tree when the server layer modification requires multiple-processing iterations of the distributed data set, wherein facilitating the server layer modification includes transmitting information related to the interaction request and receiving a server layer modified decision tree. The computer program product may include further instructions operable to generate a representation of the application layer modified decision tree or the server layer modified decision tree.

In still one further example, a computer-implemented method is provided for providing interactive decision trees. The method may include receiving, by the one or more processors, a decision tree corresponding to a distributed data set. The method may further include storing data related to the decision tree, wherein the data includes one or more data structures and one or more portions of code. The method may further include receiving input corresponding to an interaction request associated with a modification to the decision tree. The method may further include determining whether the modification requires multiple-processing iterations of the distributed data set. The method may further include generating an application layer modified decision tree when the generating requires no multiple-processing iterations of the distributed data set, wherein the application layer modified decision tree is generated using the stored data. The method may further include facilitating server layer modification of the decision tree when the server layer modification requires multiple-processing iterations of the distributed data set, wherein facilitating the server layer modification includes transmitting information related to the interaction request and receiving a server layer modified decision tree. The method may further include generating a representation of the application layer modified decision tree or the server layer modified decision tree.

In accordance with at least one embodiment, a system, method, or non-transitory computer program product may further include instructions and/or operations that include facilitating a display of the representation of the application layer modified decision tree or server layer modified decision tree, wherein facilitating the display uses a graphical interface related to the decision tree, wherein the interaction request is generated using the graphical interface, and wherein the representation of the application layer modified decision tree or the server layer modified decision tree is provided using the graphical interface.

In accordance with at least one embodiment, the server layer modified decision tree corresponds to a portion of the decision tree.

In accordance with at least one embodiment the decision tree may include a set of nodes and a set of predictor variables, wherein facilitating the server layer modification includes instructions to cause the one or more processors to perform operations including: transmitting node data corresponding to a node; transmitting predictor variable data corresponding to a predictor variable; receiving potential node split data corresponding to a potential node split, wherein the potential node split data is generated using the node and the predictor variable; and associating the potential node split data with the node.

In accordance with at least one embodiment, the multiple-processing iteration of the data set requires more than a single read of the data set.

In accordance with at least one embodiment, the interaction request relates to modifying a sub-tree of the decision tree.

In accordance with at least one embodiment, generating the server layer modified decision tree includes further instructions to cause the one or more processors to calculate a value of worth of a plurality of splits of a node of the decision tree.

In accordance with at least one embodiment, a system, method, or non-transitory computer program product may further include instructions and/or operations that include determining a computational threshold value, determining a computational requirement corresponding to the interaction request, generating the application layer modified decision tree when the computational requirement is equal to or less than the computational threshold value, and facilitating the server layer modification of the decision tree when the computational requirement exceeds the computational threshold value.

In accordance with at least one embodiment, determining whether the application layer modification requires multiple-processing iterations of the distributed data set contains further instructions to cause the one or more processors to perform operations including: executing a query using a data store, wherein the data store contains information related to a plurality of interaction request types and corresponding computational requirements for the plurality of interaction request types, wherein the interaction request corresponds to an interaction request type; and receiving information related to a computational requirement for the interaction request in response to executing the query.

In accordance with at least one embodiment, the server layer modification of the decision tree is performed using a distributed file system.

In accordance with at least one embodiment, the application layer modified decision tree uses a data structure, and wherein the server layer modification of the decision tree uses a different data structure.

In accordance with at least one embodiment, the graphical interface is provided using a thin-client application.

In accordance with at least one embodiment, the thin-client application resides on a computing device that is separate from a device including the one or more processors.

In accordance with at least one embodiment, facilitating the display uses the one or more processors to display the application layer modified decision tree, and wherein facilitating the display uses processors other than the one or more processors to display the server layer modified decision tree.

In accordance with at least one embodiment, the application programming interface is used to facilitate the display of a graphical interface.

In accordance with at least one embodiment, an application programming interface is used to transmit information related to the interaction request and to receive the server layer modified decision tree.

BRIEF DESCRIPTION OF THE DRAWINGS

FIG. 4 illustrates a number of example function calls configured to provide various functionalities related to providing an interactive decision tree associated with a distributed data set.

Like reference numbers and designations in the various drawings indicate like elements.

DETAILED DESCRIPTION

Figure 1:
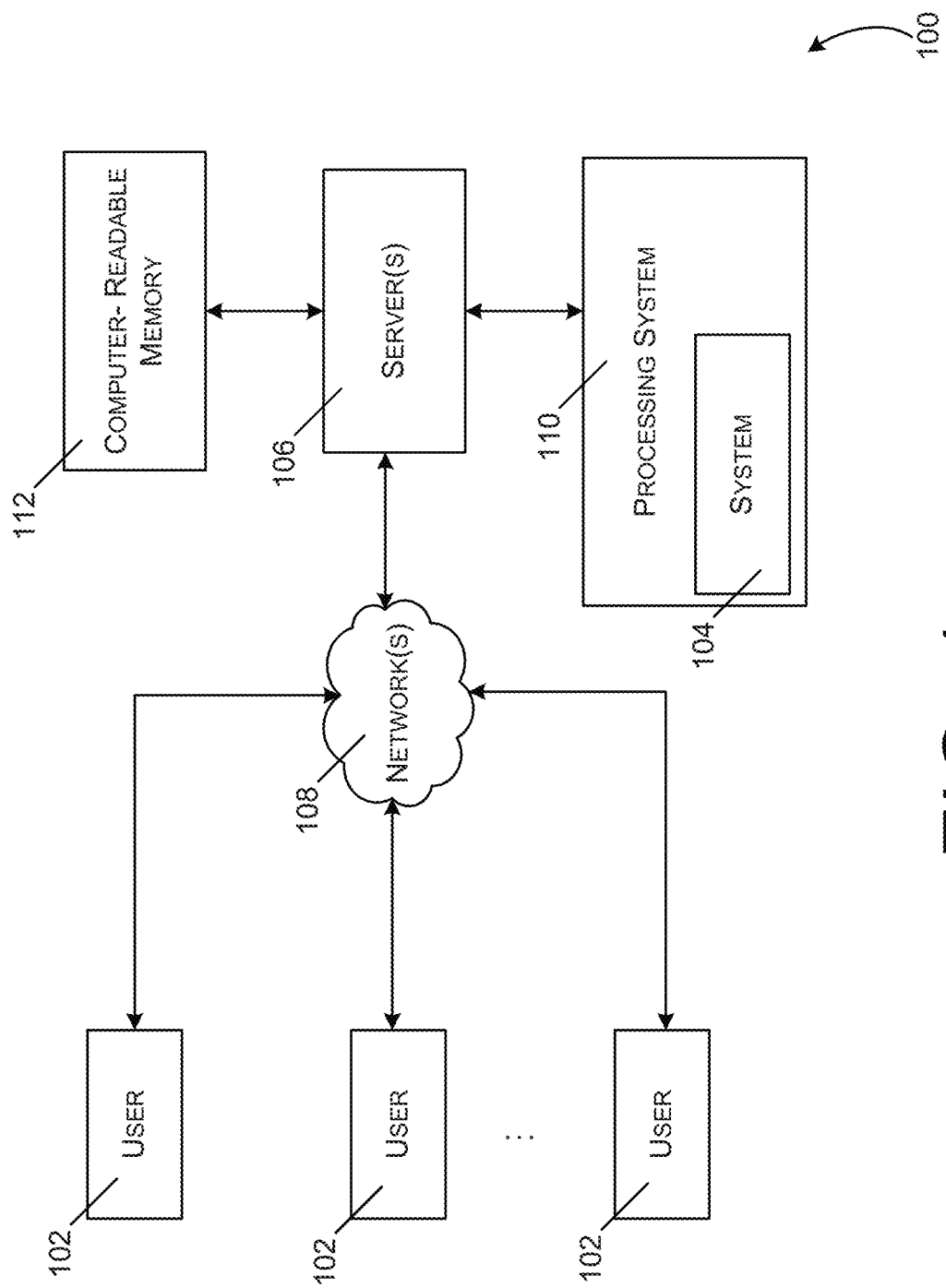
FIG. 1 illustrates a block diagram of an example of a computer-implemented environment for providing an interactive decision tree associated with a distributed data set.

Certain aspects of the disclosed subject matter relate to techniques for providing an interactive decision tree associated with a distributed data set. Decision tree algorithms are a type of machine learning algorithm that utilize recursive partitioning to segment the input data set into a tree structure that are used to make predictions and/or decisions within each segment of the data. Decision tree models may be used, for example, for predictive modeling, data stratification, missing value imputation, outlier detection and description, variable selection, and other areas of machine learning and statistical modeling. As used herein, an "interactive decision tree" is intended to refer to a decision tree that may be modified by a user utilizing a graphical interface. Some common interactive actions include, but are not limited to, pruning a node, splitting a node using a predictor (e.g., a user-specified predictor), best-splitting a node with a set of candidate predictors (e.g., a set of candidate user-specified predictors), training a sub-tree of a node, removing the latest action from a user, restoring a previous decision tree, and the like. An interactive decision tree may be implemented in a variety of analytic software and may be used to combine user inputs and data mining algorithms for building analytics models.

Current techniques for providing interactive decision trees, may be computationally expensive due to recursive nature of the underlying algorithms. This may be especially expensive when associated with large-scale data, such as a distributed data set. Techniques described herein reduce the computational burden by providing an architecture for managing calculations associated with providing an interactive decision tree for a distributed data set.

In accordance with at least one embodiment, a tree can be "learned" by splitting the data set into subsets based on an attribute value test. This process may be repeated on each derived subset in a recursive manner. The recursion may be complete, for example, when the subset at a node has all the same value of the target variable, or when splitting no longer adds value to the predictions. The recursive nature of such algorithms can make interactive decision trees difficult to implement with respect to distributed data sets, especially large-scale distributed data sets.

In accordance with at least one embodiment, a multiple-tier architecture may be configured to enable an interactive decision tree for a large-scale data set, where the large-scale data set is stored in a distributed file system (e.g., a Hadoop File System (HDFS)). For example, the functionality of an interactive decision tree may be divided into three tiers including, but not limited to, a display tier, an application tier, and a server tier. In at least one example, the display tier may include one or more display tier devices that operate a thin-client application. The thin-client application may be used, for example, for rendering visual representations of the interactive decision tree. The application tier may include one or more application tier devices that create and maintain a data structure for the interactive decision tree. The server tier may include one or more server tier devices. The server tier may, in at least one example, reside in a distributed file system and may be responsible for performing heavy-duty computations that require multiple-processing iterations on the distributed data set. As an illustrative example, computationally extensive calculations such as training a decision tree or computing worth of splits for a set of candidate predictors may be computed by a device included in the server tier.

Thus, the processes described below provide minimized communication between the server tier and the application tier resulting in fewer calculations by a server tier device than in a system that does not implement the multiple-tier architecture disclosed herein. All tiers discussed herein may be developed in memory, thus, alleviating the need for memory-disk input/output operations once the data set has been loaded in a distributed file system of the server tier. Further, as a result of the multiple-tier architectures described herein, operations related to an interaction request that do not require multiple-processing iterations of a distributed data set may be executed by the application tier devices independently from the server tier saving server resources for more computationally-intensive tasks. As used herein, "multiple-processing iterations" is intended to describe interactions between the user and the representation of a decision tree where the interaction requires generation of new statistics or data segmentation. Both tasks of generating new statistics and segmenting data require one or more processing iterations of the original data set. For example, in order to split a node of a decision tree using a variable, one processing iteration will be necessary to compute which of a number of variables specified by the user is the optimal variable to spit the node (e.g., segmenting the data), and another processing iteration will be necessary in order to compute chi-square statistics (e.g., generating statistics). Interactions that require a single interaction of the distributed data set require no new statistics or information from the original data such as, for example, undo-ing a user action, pruning a node, and the like.

As a result of the multiple-tier architectures described herein, a real-time interactive decision tree may be implemented for a large-scale distributed file system. Such a design allows multiple display devices to build a decision tree and interact with a decision tree concurrently, or substantially simultaneously. Additionally, devices that lack the computational capability to execute multiple iterations of processing on large distributed data sets, or devices that are merely undesirable to use for such purposes, may nonetheless interact with data sets utilizing the tiers discussed herein as the most computationally intensive tasks are performed at the server level, separate from the device.

FIG. 1 illustrates a block diagram of an example of a computer-implemented environment 100 for providing an interactive decision tree associated with a distributed data set. The users 102 can interact with a system 104 hosted on one or more servers 106 through one or more networks 108. The system 104 can contain software operations or routines. The users 102 can interact with the system 104 through a number of ways, such as over the networks 108. The servers 106, accessible through the networks 108, can host the system 104. The system 104 can also be provided on a stand-alone computer for access by a user.

In one example, the computer-implemented environment 100 may include a stand-alone computer architecture where a processing system 110 (e.g., one or more computer processors) includes the system 104 being executed on it. The processing system 110 has access to a computer-readable memory 112.

In one example, the computer-implemented environment 100 may include a client-server architecture. The users 102 may utilize a PC to access the servers 106 running the system 104 on the processing system 110 via the networks 108. The servers 106 may access the computer-readable memory 112.

Figure 2:
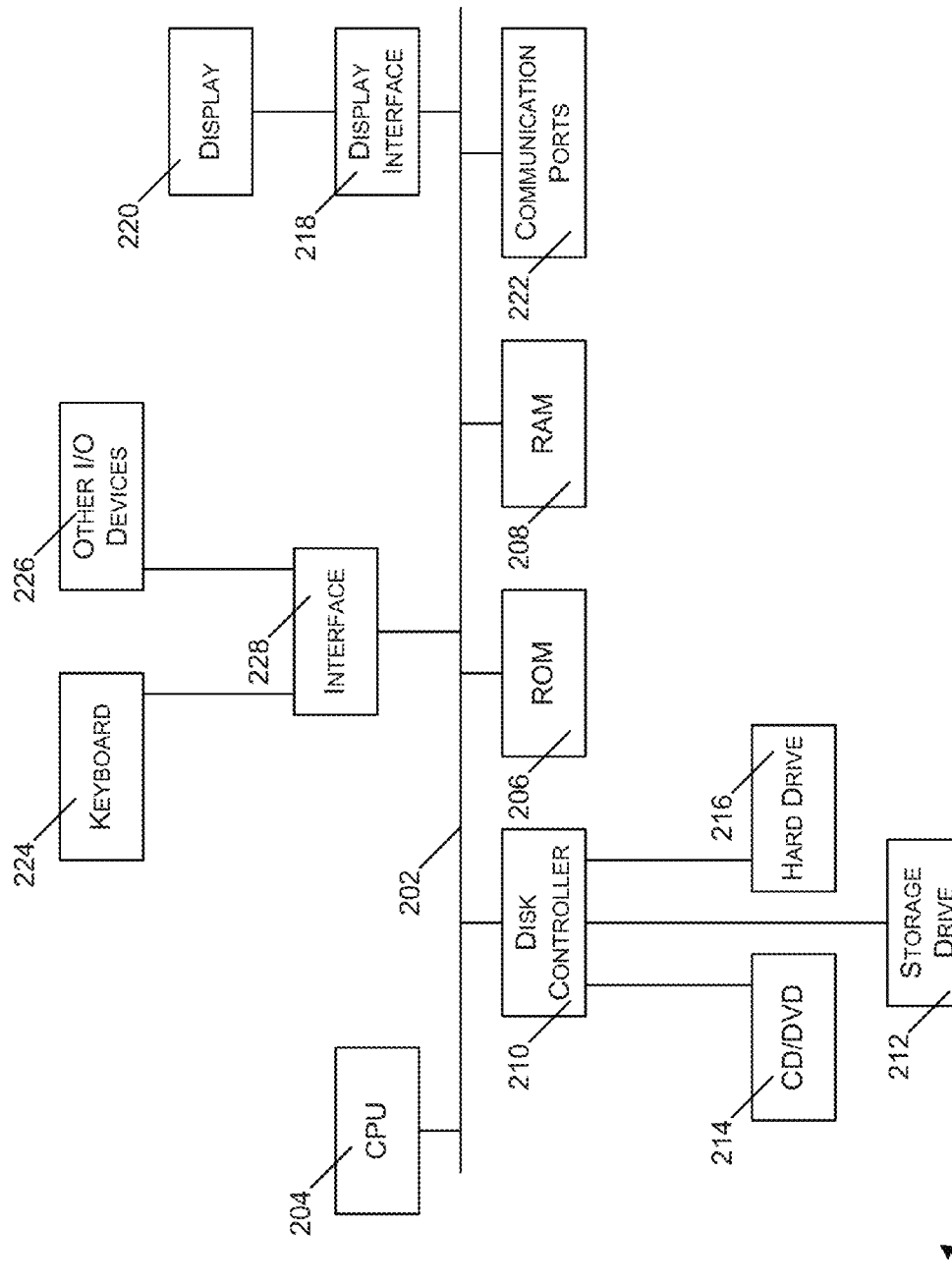
FIG. 2 illustrates a block diagram of an example of a processing system of FIG. 1 for providing an interactive decision tree associated with a distributed data set.

FIG. 2 illustrates a block diagram of an example of a processing system 110 of FIG. 1 for providing an interactive decision tree associated with a distributed data set. A bus 202 may interconnect the other illustrated components of the processing system 110. A central processing unit (CPU) 204 (e.g., one or more computer processors) may perform calculations and logic operations used to execute a program. A processor-readable storage medium, such as a read-only memory (ROM) 206 and a random access memory (RAM) 208, may be in communication with the CPU 204 and may contain one or more programming instructions. Optionally, program instructions may be stored on a computer-readable storage medium, such as a magnetic disk, optical disk, recordable memory device, flash memory, or other physical storage medium. Computer instructions may also be communicated via a communications transmission, data stream, or a modulated carrier wave. In one example, program instructions implementing the various aspects of providing an interactive decision tree associated with a distributed data set, as described further in this description, may be stored on a storage drive 212, a hard drive 216, a read-only memory (ROM) 206, a random-access memory (RAM) 208, or may exist as a stand-alone service external to the stand-alone computer architecture.

Some or all of the process described in relation to providing an interactive decision tree may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

A disk controller 210 can interface with one or more optional disk drives to the bus 202. These disk drives may be external or internal floppy disk drives such as a storage drive 212, external or internal CD-ROM, CD-R, CD-RW, or DVD drives 214, or external or internal hard drive 216. As indicated previously, these various disk drives and disk controllers are optional devices.

A display interface 218 may permit information from the bus 202 to be displayed on a display 220 in audio, graphic, or alphanumeric format. Communication with external devices may optionally occur using various communication ports 222. In addition to the standard computer-type components, the hardware may also include data input devices, such as a keyboard 224, or other input/output devices 226, such as a microphone, remote control, touchpad, keypad, stylus, motion, or gesture sensor, location sensor, still or video camera, pointer, mouse or joystick, which can obtain information from bus 202 via interface 228.

Figure 3A:
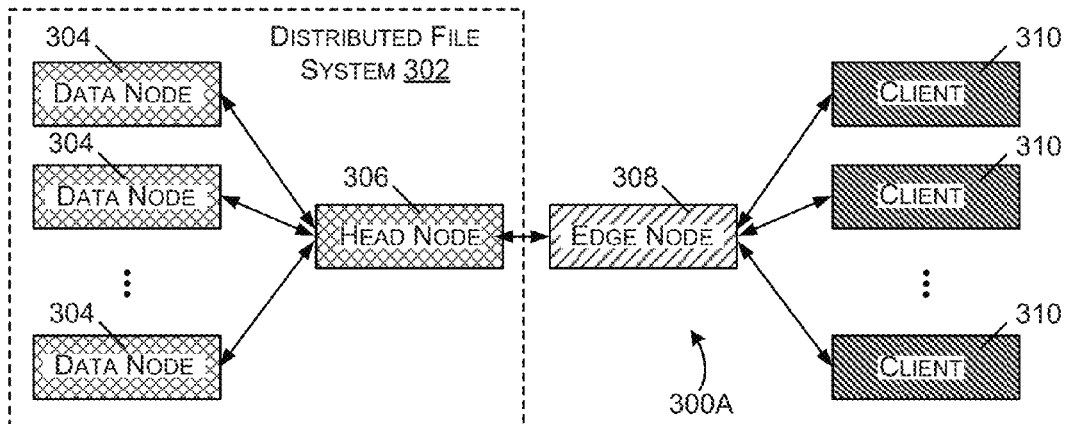
FIGS. 3A-3C each illustrate an example architecture for providing an interactive decision tree.
Figure 3B:
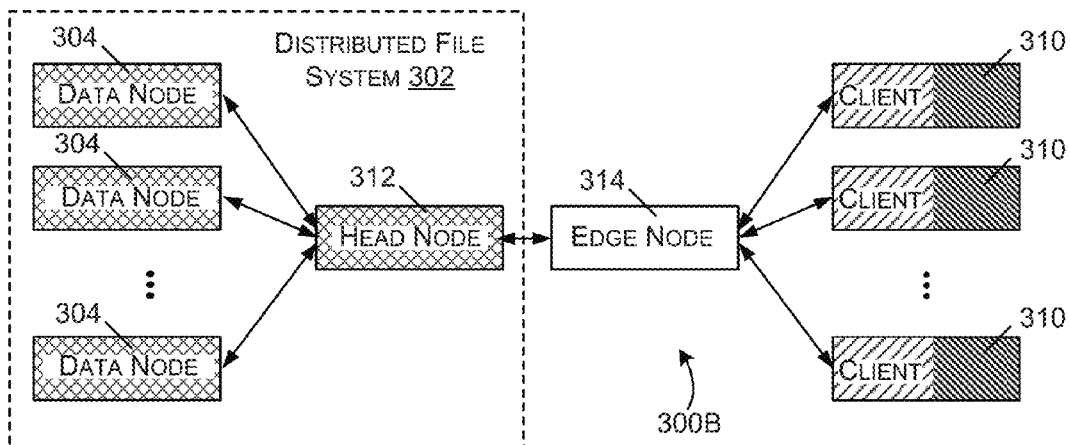
Figure 3C:
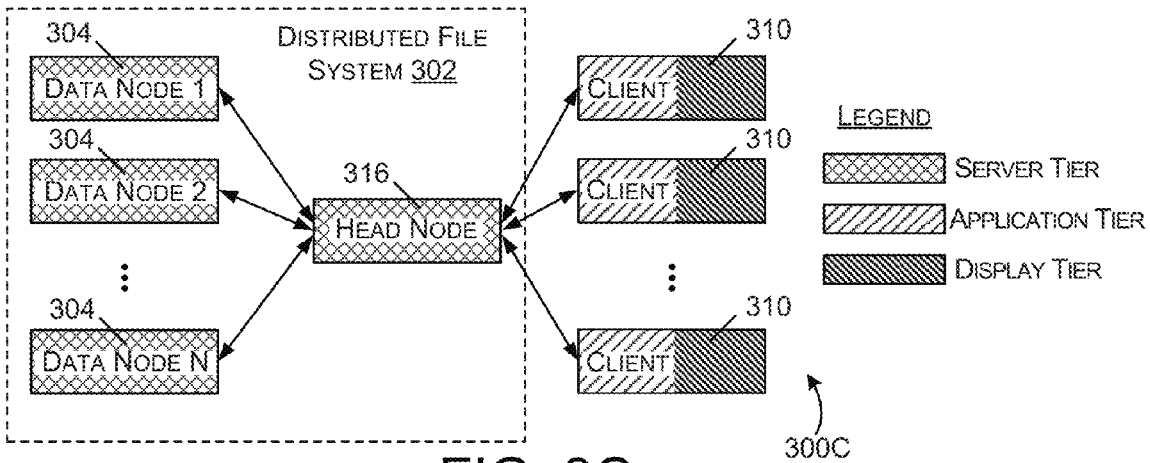

FIGS. 3A-3C each illustrate an example architecture (e.g., architectures 300A-300C) for providing an interactive decision tree. Architectures 300A-300C may each include a distributed file system 302. The distributed file system 302 of architectures 300A-300C may use Hadoop®, an open-source framework for storing and analyzing big data in a distributed computing environment, though any suitable distributed computing environment may be utilized (e.g., PCFS, Lustre, GFS, SAS LASR Analytic Server, and the like). For illustrative purposes, the architectures 300A-300C may be assumed to implement multiple-node Hadoop® clusters. The distributed file system 302 of architectures 300A-300C may each include one or more data nodes 304. The number and configuration of the data nodes 304 may vary. Application data may be stored on the data nodes 304. All nodes described in the following examples may be fully connected and communicate with each other using Transmission Control Protocol (TCP)-based protocols. Data nodes 304, head node 306, edge node 308, head node 312, edge node 314, head node 316, and client devices 310 may each represent a computing device or a blade. In some embodiments, nodes 304-316 may exist on a same device or different devices. In some examples, nodes 304-316 may reside on one or more devices that share one or more processors and/or one or more non-transitory computer-readable memories. In at least one example, data may be replicated on multiple of the data nodes 304 to ensure data reliability. In the following examples, client devices 310 may include, but are not limited to, laptops, tablet PCs, desktop PCs, smart phones, or any suitable electronic device including one or more processors.

In accordance with at least one embodiment, FIG. 3A illustrates a first example architecture 300A for providing an interactive decision tree. The distributed file system 302 of FIG. 3A may include a head node 306. The head node 306 may be responsible for storing metadata on a dedicated server and for coordinating data storage functions. The architecture 300A may include an edge node 308. The edge node 308 may act as an interface between the distributed file system 302 of FIG. 3A and client devices 310 of FIG. 3A. The edge node 308 may be used to run client applications and cluster administration tools with respect to data transmitted to and from distributed file system 302 of FIG. 3A. The architecture 300A may include one or more client devices 310.

In accordance with at least one embodiment, a server tier including one or more server tier devices that may be configured within the architecture 300A. For example, the server tier may include one or more data nodes 304 and at least one head node 306. The server tier (e.g., the data nodes 304 of FIG. 3A in conjunction with the head node 306) may perform computationally expensive decision tree computations that require multiple iterations through the distributed file system 302 of FIG. 3A.

In accordance with at least one embodiment, an application tier including one or more application tier devices that may be configured within the architecture 300A. For example, the application tier may include edge node 308. The application tier may maintain and update one or more decision tree data structures. Various interactive features described throughout this specification may result in a modification or query to a decision tree structure stored in the application tier device(s) (e.g., the edge node 308). The application tier (e.g., the edge node 308 of FIG. 3A) may perform computations for a decision tree algorithm that do not include multiple-processing interactions.

In accordance with at least one embodiment, a display tier including one or more display tier devices may be configured within the architecture 300A. For example, the display tier may include the client devices 310 of FIG. 3A. The display tier, in this example, provides visual representations of interactive decision trees. In at least one example, the computations performed at the display layer involve operations included in displaying visual representations of decision trees and communicating user interactions away from the client devices 310.

In accordance with at least one embodiment, FIG. 3B illustrates a second example architecture 300B for providing an interactive decision tree. The distributed file system 302 of FIG. 3B may include one or more of the data nodes 304 of FIG. 3B. The distributed file system 302 of FIG. 3B may include a head node 312. The head node 312 may be responsible for storing metadata on a dedicated server and for coordinating data storage functions. The architecture 300B may include an edge node 314. The edge node 314 may act as an interface between the distributed file system 302 of FIG. 3B and client devices 310 of FIG. 3B. The architecture 300B may include one or more client devices 310.

In accordance with at least one embodiment, a server tier includes one or more server tier devices may be configured within the architecture 300B. For example, server tier may include data nodes 304 of FIG. 3B and head node 312. The server tier (e.g., the data nodes 304 of FIG. 3B in conjunction with head node 312) may perform computationally expensive interactive decision tree computations that require multiple iterations through the distributed file system 302 of FIG. 3B.

In accordance with at least one embodiment, client devices 310 of FIG. 3B may be configured to include both application tier functionality as well as display tier functionality. Thus, the client devices 310 of FIG. 3B may perform operations including, but not limited to, maintaining and updating one or more decision tree data structures, modifying or querying a decision tree structure stored on the client devices 310 of FIG. 3B), performing computations that are not related to a multiple-processing decision tree algorithm, providing visual representations of decision trees, and the like.

In accordance with at least one embodiment, FIG. 3C illustrates a third example architecture 300C for providing an interactive decision tree. The distributed file system 302 of FIG. 3C may include one or more of the data nodes 304 of FIG. 3C. The distributed file system 302 of FIG. 3C may include a head node 316. The head node 316 may be responsible for storing metadata on a dedicated server and for coordinating data storage functions as well as providing an interface between distributed file system 302 of FIG. 3C and client devices 310 of FIG. 3C. The architecture 300C may include one or more client devices 310.

In accordance with at least one embodiment, a server tier including one or more server tier devices may be configured within the architecture 300C that includes the data nodes 304 of FIG. 3C and the head node 316. The server tier (e.g., the data nodes 304 of FIG. 3C in conjunction with head node 316) may perform computationally expensive decision tree computations that require multiple iterations through the distributed file system 302 of FIG. 3C.

In accordance with at least one embodiment, client devices 310 of FIG. 3C may be configured to include both application tier functionality as well as display tier functionality. Thus, the client devices 310 of FIG. 3C may perform operations including, but not limited to, maintaining and updating one or more decision tree data structures, modifying or querying a decision tree structure stored on the client devices 310 of FIG. 3C), performing computations that are not related to a multiple-processing decision tree algorithm, providing visual representations of decision trees, and the like.

The architectures 300A-300C are intended to be illustrative in nature. Any number and combination of data nodes, head nodes, edge nodes, and client devices may be utilized and will be apparent to one skill in the art of configuring distributed file systems.

FIG. 4 illustrates a number of example function calls 400 configured to provide various functionalities related to providing an interactive decision tree associated with a distributed data set. For example, an application tier device (described above in connection with FIGS. 3A-3C) may utilize a number of application tier data structures and functions.

In accordance with at least one embodiment, the application tier device may utilize at least the following structures. For example, a data structure (e.g., a "Tree") may be utilized by an application tier device. In at least one example, the Tree may store interactive decision tree node information including, but not limited to, response profiles, a root node, one or more parent nodes, one or more child nodes, one or more spilt variables, one or more split rules, and the like. A "DisplayTree" data structure may be utilized by an application tier device. A "DisplayTree" data structure may be generated from a Tree data structure. The DisplayTree may be utilized by display tier devices to provide a visual representation of an interactive decision tree.

In accordance with at least one embodiment, the application tier devices may utilize at least the following functions. For example, a function (e.g., Tree.Append) may be utilized to append a sub-tree generated by a server to a tree node in a decision tree. A function (e.g., Tree.AppendWorth) may be utilized to append worth of splits information (e.g., via a table) to a tree node in the current decision tree. A function (e.g., Tree.Display) may be utilized to generate a DisplayTree data structure. A function (e.g., Tree.GetPath) may be utilized to return a path from the root node to a specific node. The path may be used for filtering observations from the data set. A function (e.g., Tree.GetSplitVar) may be utilized to return a splitting variable and a splitting rule corresponding to a specific node in the Tree. A function (e.g., Tree.GetSubTree) may be utilized to return a sub-tree structure associated with a specific node. A function (e.g., Tree.Next) may be utilized to return a current (e.g., next) snapshot of a Tree data structure. A function (e.g., Tree.Previous) may be utilized to return the previous snapshot of a Tree data structure. A function (e.g., Tree.Remove) may be utilized to remove a sub-tree structure associated with a specific node. A function (e.g., Tree.Save) may be utilized to save a Tree data structure in memory (e.g., on an application tier device). A function (e.g., Tree.SetSplitValue) may be utilized to manually update a splitting value associated with a specific node. A function (e.g., Tree.UpdateSubTree) may be utilized to update a sub-tree structure associated with a specific node.

In accordance with at least one embodiment, the server tier may include, but is not limited to, the following structures. For example, a data structure (e.g., a "ServerTree") may be utilized by server tier devices. In at least one example, the ServerTree may store node information associated with each node, the node information including, but not limited to, response profiles, a parent node, one or more child nodes, one or more spilt variables, one or more split rules, and the like.

In accordance with at least one embodiment, the server tier devices may utilize at least the following function calls. A function (e.g., ServerTree.GetWorth) may be utilized to return a table of worth of splits associated with one or more candidate variables that may be used to split a specific node. A function (e.g., ServerTree.Train) may be utilized to train a decision tree or sub-tree of a node. A function (e.g., ServerTree.Update) may be utilized to provide/update a summary of statistics in a Tree without changing the Tree structure. ServerTree.Update may include, but is not limited to, operations for copying a sub-tree from one node to another and obtaining a summary of statistics on validation and/or testing data sets or streaming data.

In the following examples described in FIGS. 5-12, let D be an input data set, Y be a response variable in the decision tree model (e.g., one column of the input data set), and X be a set of predictors (e.g., one or more predictors).

Figure 5:
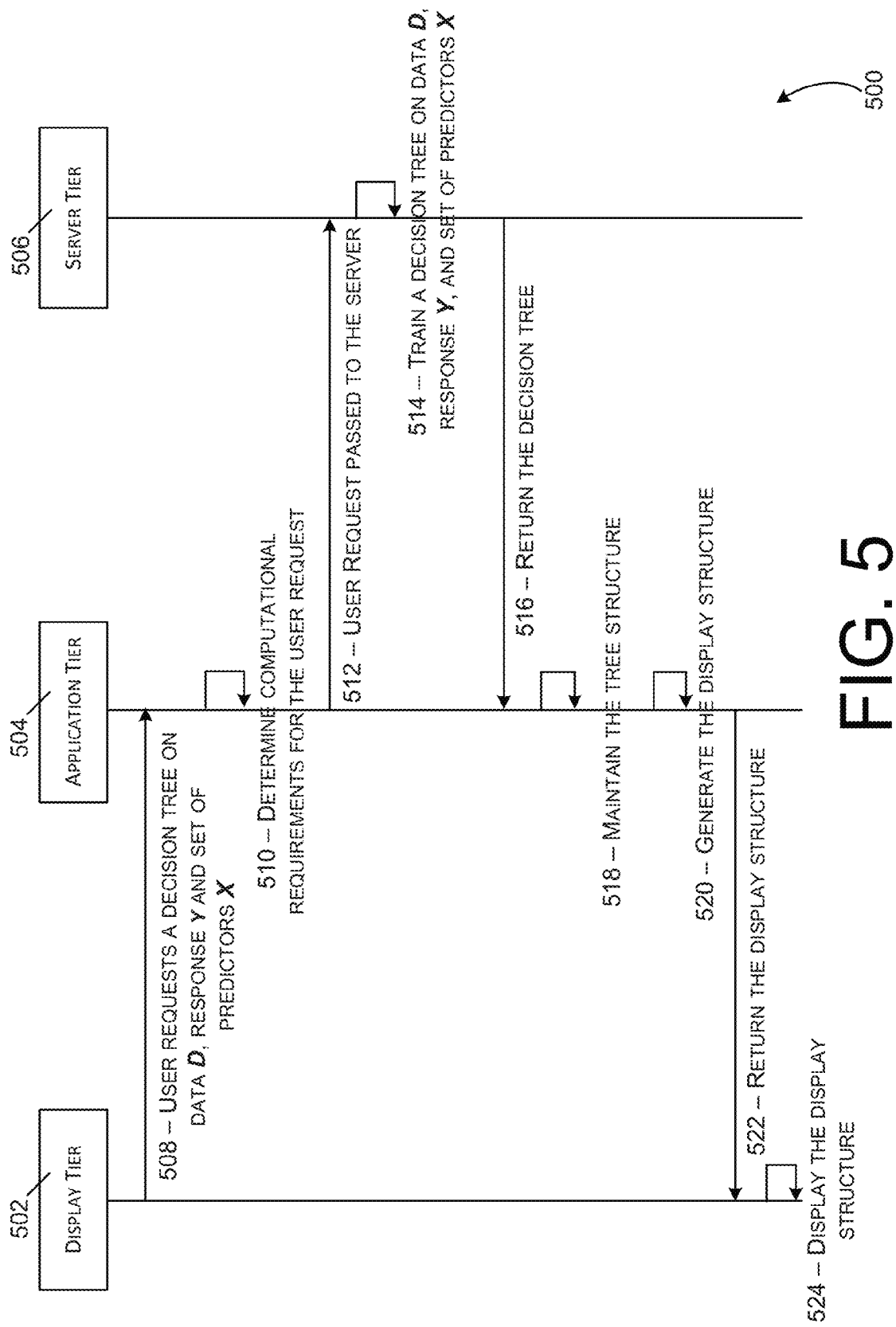
FIG. 5 illustrates an example process for providing an interactive decision tree, in accordance with at least one embodiment.

FIG. 5 illustrates an example process 500 for providing an interactive decision tree, in accordance with at least one embodiment. The process 500 may utilize a display tier device 502 (e.g., one of the display tier devices described in connection with FIGS. 3A-3C), an application tier device 504 (e.g., one of the application tier devices described in connection with FIGS. 3A-3C), and a server tier device 506 (e.g., one of the server tier devices described in connection with FIGS. 3A-3C). In at least one example, the display tier device 502 and the application tier device 504 may be the same device.

The process 500 may begin at 508, where a user may request (e.g., via an interaction request) a decision tree to be constructed using data set D, response variable Y, and a set of predictors X via an interaction request. For example, a user may request a decision tree by utilizing a graphical user interface (e.g., the graphical user interface of FIG. 13, described below) to identify a data set, a response variable, and a set of predictors. The interaction request may include, but is not limited to, interaction information corresponding to the data set D, the response variable Y, and the set of predictors X. The interaction request information may be communicated by the display tier device 502 to the application tier device 504. At 510, the application tier device 504 may execute operations to determine the computational requirements for the user request. For example, the application tier device may execute operations that determine that the computational requirements of the interaction request (e.g., a request for a decision tree) require multiple pass iterations of the data set D. In at least one example, the determination of computational requirements for the user request may include a query of a data store responsible for storing such information. For example, a table may be accessible that provides indications of the computational requirements for various function calls. When a function is called, the table may be queried to determine whether or not the function will require multiple passes of the data set. The query may return an integer, a Boolean, or any suitable means for indicating computational requirements. Additionally, or alternatively, computational requirements of a user's request may be calculated using the size of the data set, the computational capabilities of the device (e.g., memory, processing speed, connection speed, etc.), the computational capabilities of the server(s) (e.g., memory, processing speed, connection speed, server farm size, etc.), the size of the decision tree structure, a number of nodes, user preferences information, or any suitable combination thereof. In some embodiments, if the computational requirement(s) for the user request is above a particular threshold value, one or more remote devices (e.g., one or more server devices) may be used to process the request. In some cases, if the computational requirement(s) for the user request is below a particular threshold value, a local device (e.g., the user's device) may be used to process the request.

In accordance with at least one embodiment, based on the decision at 510, the interaction request information may be passed to the server tier device 506 at 512. At 514, the server tier device 506 may execute operations (e.g., ServerTree.Train of FIG. 4) to train a decision tree using the data set D, the response variable Y, and the set of predictors X.

In accordance with at least one embodiment, the server tier device 506 may return a trained decision tree at 516. The application tier device 504, may utilize the data returned at 518 to maintain a tree structure (e.g., a Tree data structure of FIG. 4). "Maintaining a tree structure," as used herein, may include creating and/or updating a Tree data structure. For example, application tier device 504 may utilize the function Tree.Save of FIG. 4 to save the Tree data structure in memory. A DisplayTree data structure may be generated (e.g., utilizing the function Tree.Display of FIG. 4) at 520 using the Tree structure described at 518. Information corresponding to the generated DisplayTree data structure may be communicated to display tier device 502 at 522. The display tier device 502 may display (e.g., via a thin-client application) a visual representation of the DisplayTree data structure at 524.

Figure 6:
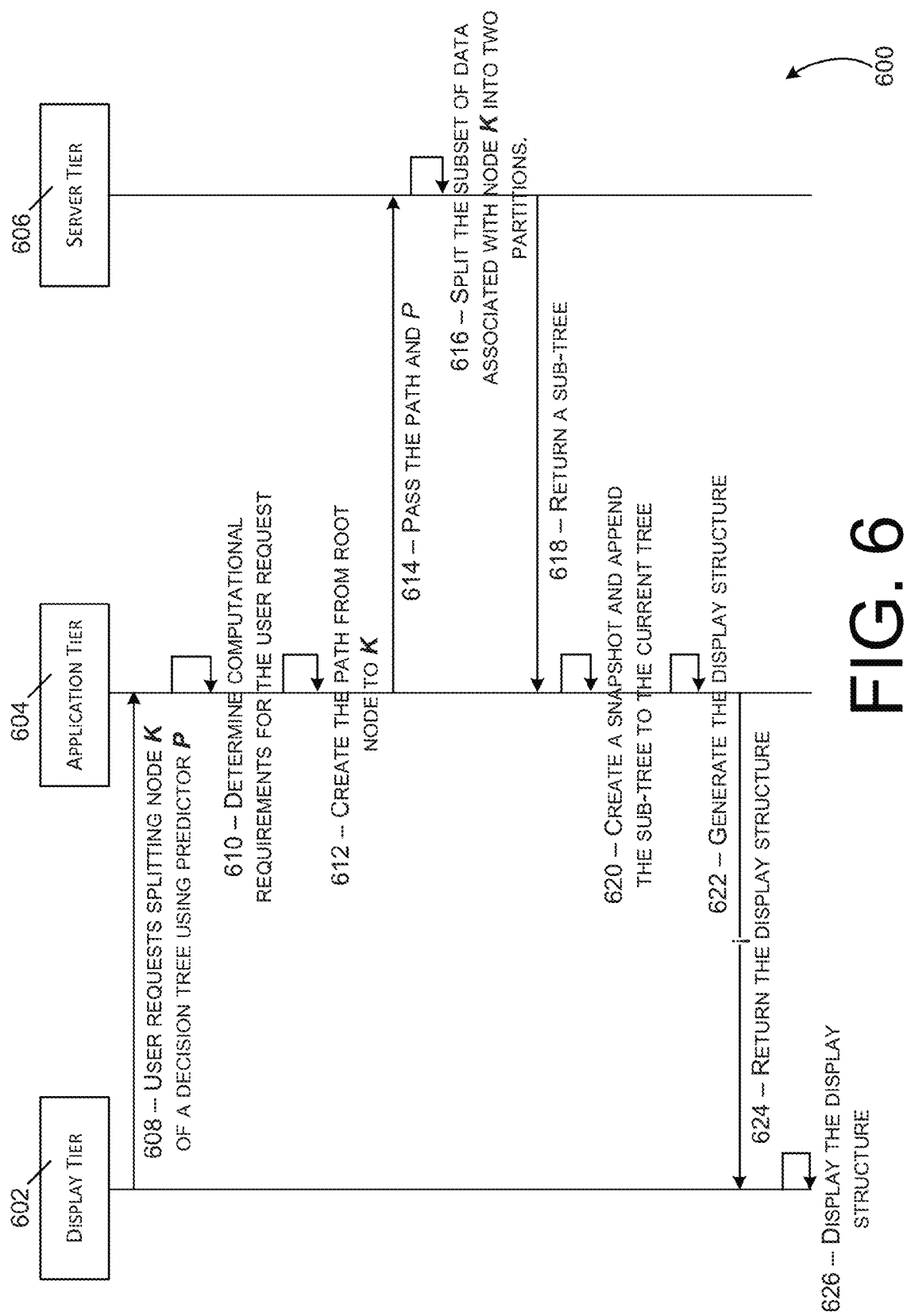
FIG. 6 illustrates an example process for splitting a node of an interactive decision tree, in accordance with at least one embodiment.

FIG. 6 illustrates an example process 600 for splitting a node of an interactive decision tree, in accordance with at least one embodiment. The process 600 may utilize a display tier device 602 (e.g., one of the display tier devices described in connection with FIGS. 3A-3C), an application tier device 604 (e.g., one of the application tier devices described in connection with FIGS. 3A-3C), and a server tier device 606 (e.g., one of the server tier devices described in connection with FIGS. 3A-3C). In at least one example, the display tier device 602 and the application tier device 604 may be the same device.

It should be appreciated that while examples included through this description may discuss binary decision trees (e.g., decision trees that have nodes that have, at most, two corresponding child nodes), non-binary trees (e.g., decision trees having nodes with any number of corresponding child nodes) may be utilized with any process, function call, interface, etc. described herein.

The process 600 may begin at 608, where a user may request (e.g., via an interaction request) a splitting of a node K of a decision tree using a predictor variable P. For example, a user may request to split a node of a decision tree by utilizing a graphical user interface (e.g., the graphical user interface of FIG. 14, described below) to identify a node and a predictor variable. The interaction request may include, but is not limited to, user request information corresponding to the node K and the predictor variable P. The interaction request information may be communicated by the display tier device 602 to the application tier device 604. At 610, the application tier device 604 may execute operations that determine the computational requirements for the interaction request. For example, the application tier device 604 may execute operations that determine that the computational requirements of the interaction request (e.g., a request to split a node) require multiple pass iterations of the data set D.

In accordance with at least one embodiment, at 612, a path may be created from the root node of the decision tree to node K (e.g., utilizing the function Tree.GetPath of FIG. 4). The path, in at least one example, may be used to filter observations of the data set D. The information corresponding to at least the path and P may be passed to server tier device 606 at 614.

In accordance with at least one embodiment, at 616, the server tier device 606 may execute operations to split a subset of data associated with node K, into two partitions (e.g., utilizing the function ServerTree.Train function of FIG. 4, D, Y, P, and the path created at 612). In accordance with at least one embodiment, the server tier device 506 may return a sub-tree at 618. At 620, the application tier device 604 may create a snapshot of the Tree structure (e.g., utilizing the Tree.Previous function of FIG. 4) and may further utilize the data returned at 618 to append the sub-tree data to a Tree structure (e.g., utilizing the Tree.Append function of FIG. 4). For an update to an existing sub-tree, the sub-tree data of the Tree structure may be updated using the data returned at 618 (e.g., utilizing the Tree.UpdateSubTree function of FIG. 4). A DisplayTree data structure may be generated (e.g., utilizing the function Tree.Display of FIG. 4) at 622 using the Tree structure described at 620. Information corresponding to the generated DisplayTree data structure may be communicated to display tier device 602 at 624. The display tier device 602 may display (e.g., via a thin-client application) a visual representation of the DisplayTree data structure at 626 (e.g., utilizing the graphical user interface of FIG. 15, described below).

Figure 7:
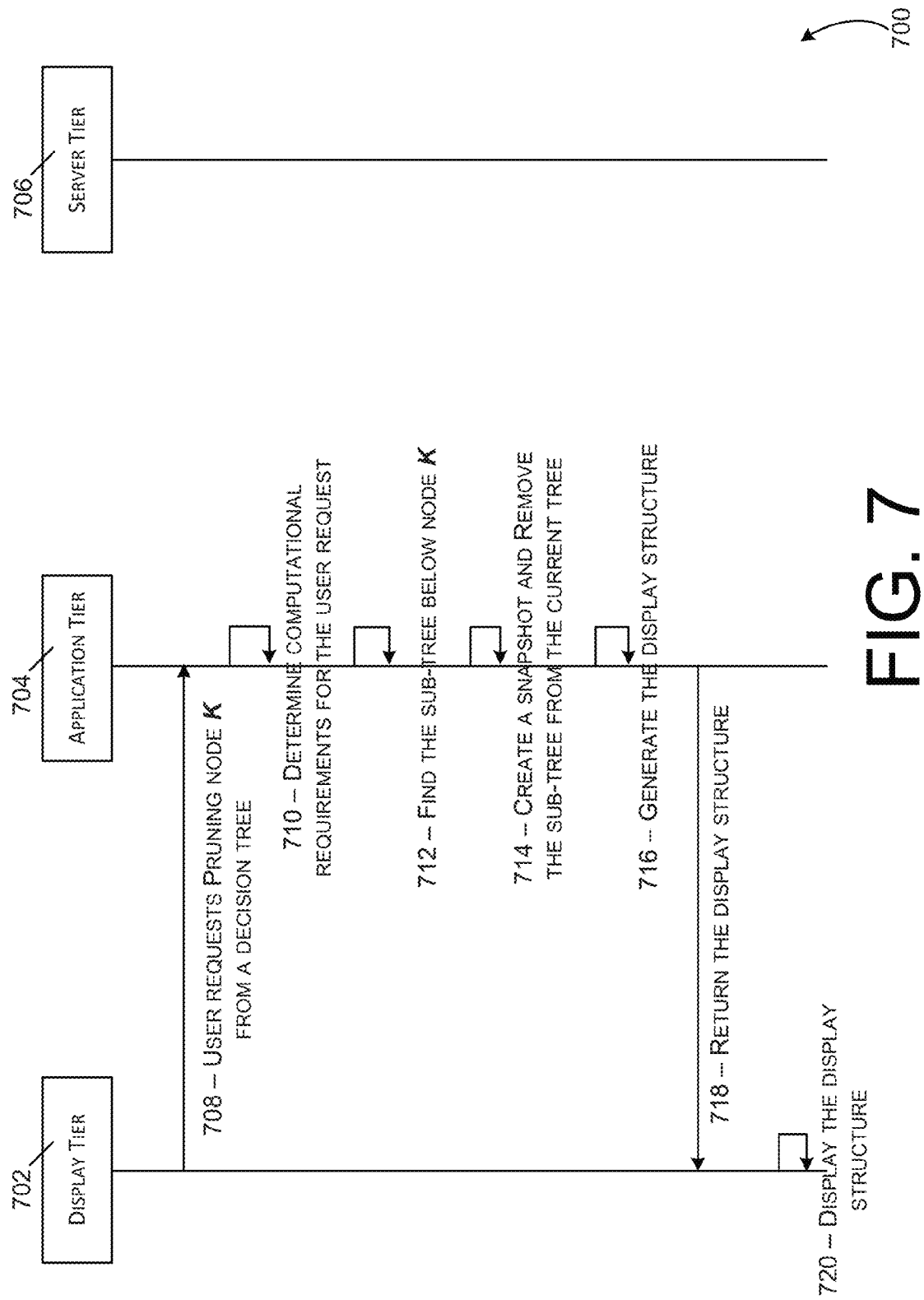
FIG. 7 illustrates an example process for pruning a node of an interactive decision tree, in accordance with at least one embodiment.

FIG. 7 illustrates an example process 700 for pruning a node of an interactive decision tree, in accordance with at least one embodiment. The process 700 may utilize a display tier device 702 (e.g., one of the display tier devices described in connection with FIGS. 3A-3C), an application tier device 704 (e.g., one of the application tier devices described in connection with FIGS. 3A-3C), and a server tier device 706 (e.g., one of the server tier devices described in connection with FIGS. 3A-3C). In at least one example, the display tier device 702 and the application tier device 704 may be the same device.

The process 700 may begin at 708, where a user may request (e.g., via an interaction request) pruning of a node K of a decision tree. For example, a user may request pruning of a node K of a decision tree by utilizing a graphical user interface (e.g., the graphical user interface of FIG. 16, described below) to identify a node to prune. The interaction request may include, but is not limited to, interaction request information corresponding to the node K. The interaction request information may be communicated by the display tier device 702 to the application tier device 704. At 710, the application tier device 704 may execute operations that determine the computational requirements for the interaction request. For example, the application tier device 704 may execute operations that determine that the computational requirements of the interaction request (e.g., a request to prune a node) do not require multiple pass iterations of the data set D.

In accordance with at least one embodiment, the application tier device 704 may execute operations to identify a sub-tree below node K at 712 (e.g., utilizing the Tree.GetSubTree function of FIG. 4). At 714, the application tier device 704, may create a snapshot of the Tree structure (e.g., utilizing the Tree.Next function of FIG. 4) and may further utilize the data returned at 712 to remove the sub-tree data from the Tree structure (e.g., utilizing the Tree.Remove function of FIG. 4). A DisplayTree data structure may be generated (e.g., utilizing the function Tree.Display of FIG. 4) at 716 using the Tree structure described at 716. Information corresponding to the generated DisplayTree data structure may be communicated to display tier device 702 at 718. The display tier device 702 may display (e.g., via a thin-client application) a visual representation of the DisplayTree data structure at 720 (e.g., utilizing the graphical user interface of FIG. 17, described below).

Figure 8:
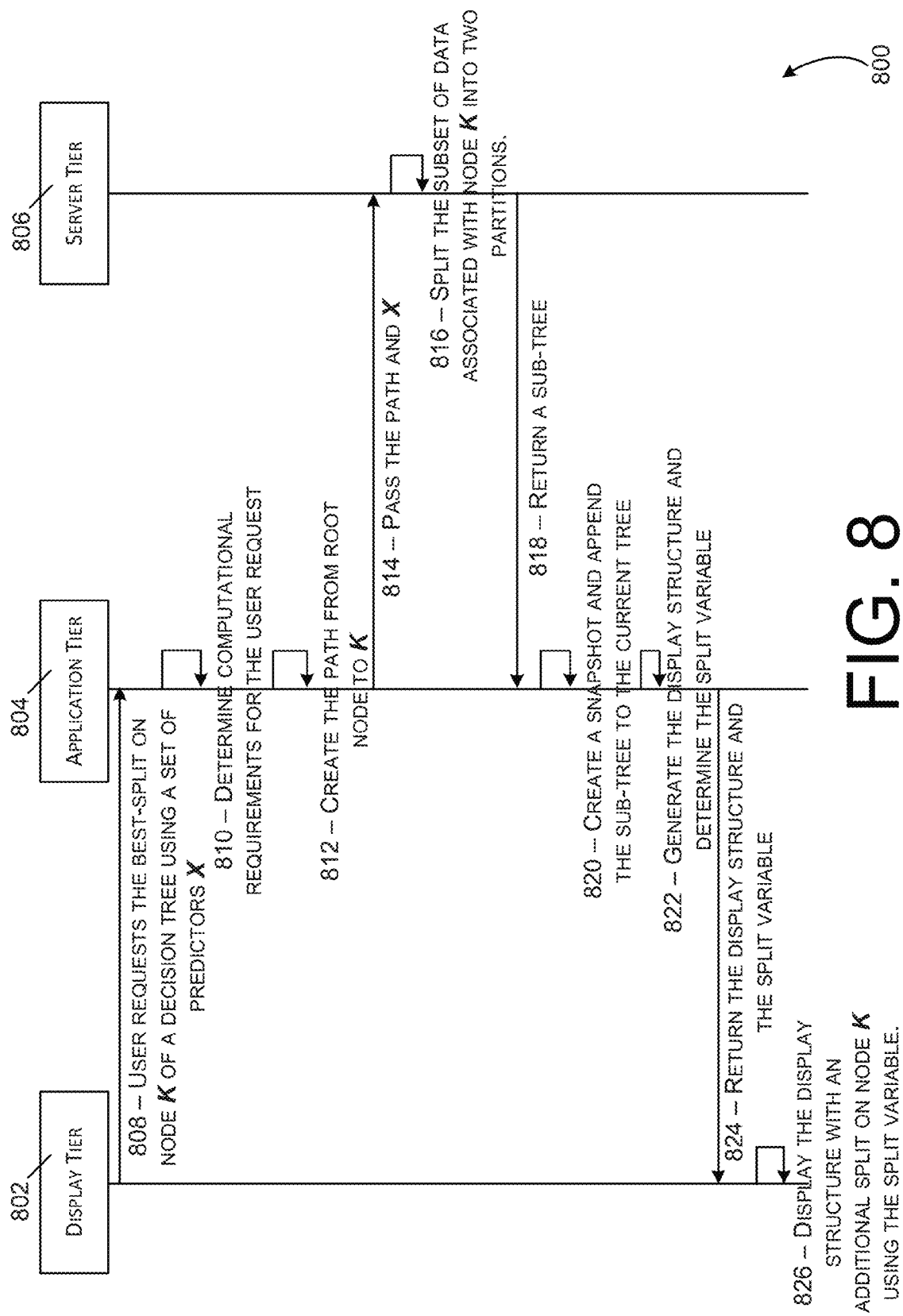
FIG. 8 illustrates an example process for determining a best-split of a node of an interactive decision tree, in accordance with at least one embodiment.

FIG. 8 illustrates an example process 800 for determining a best-split of a node of an interactive decision tree, in accordance with at least one embodiment. The process 800 may utilize a display tier device 802 (e.g., one of the display tier devices described in connection with FIGS. 3A-3C), an application tier device 804 (e.g., one of the application tier devices described in connection with FIGS. 3A-3C), and a server tier device 806 (e.g., one of the server tier devices described in connection with FIGS. 3A-3C). In at least one example, the display tier device 802 and the application tier device 804 may be the same device.

The process 800 may begin at 808, where a user may request (e.g., via an interaction request) a best-split determination of a node K of a decision tree using a set of predictor variables X. For example, a user may request a best-split determination of a node of a decision tree by utilizing a graphical user interface (e.g., the graphical user interface of FIG. 18, described below) to identify a node. The interaction request may include, but is not limited to, interaction request information corresponding to the node K and the set of predictor variables X. The interaction request information may be communicated by the display tier device 802 to the application tier device 804. At 810, the application tier device 804 may execute operations that determine the computational requirements for the interaction request. For example, the application tier device 804 may execute operations that determine that the computational requirements of the interaction request (e.g., a request to determine a best-split of a node) require multiple pass iterations of the data set D.

At 812, a path may be created from the root node of the decision tree to node K (e.g., utilizing the function Tree.GetPath of FIG. 4). The path, in at least one example, may be used to filter observations of the data set D. The information corresponding to at least the path and the set of predictor variables X may be passed to server tier device 806 at 814.

At 816, the server tier device 806 may execute operations to split a subset of data associated with node K, into two partitions (e.g., utilizing the function ServerTree.Train function of FIG. 4, D, Y, X, and the path created at 812). Two partitions are used as an example, it should be appreciated that the node may be split in any number of partitions. In accordance with at least one embodiment, the server tier device 806 may return a sub-tree at 818. At 820, the application tier device 804, may create a snapshot of the Tree structure (e.g., utilizing the Tree.Previous function of FIG. 4) and may further utilize the data returned at 818 to append the sub-tree data to the current Tree structure (e.g., utilizing the Tree.Append function of FIG. 4). For an update to an existing sub-tree, the sub-tree data of the Tree structure may be updated using the data returned at 818 (e.g., utilizing the Tree.UpdateSubTree function of FIG. 4). A DisplayTree data structure may be generated (e.g., utilizing the function Tree.Display of FIG. 4) at 822 using the Tree structure described at 820. A split variable may be determined (e.g., utilizing the function Tree.GetSplitVar of FIG. 4). Information corresponding to the generated DisplayTree data structure and the split variable may be communicated to display tier device 802 at 824. The display tier device 802 may display (e.g., via a thin-client application) a visual representation of the DisplayTree data structure using the split variable at 826 (e.g., utilizing the graphical user interface of FIG. 19, described below).

Figure 9:
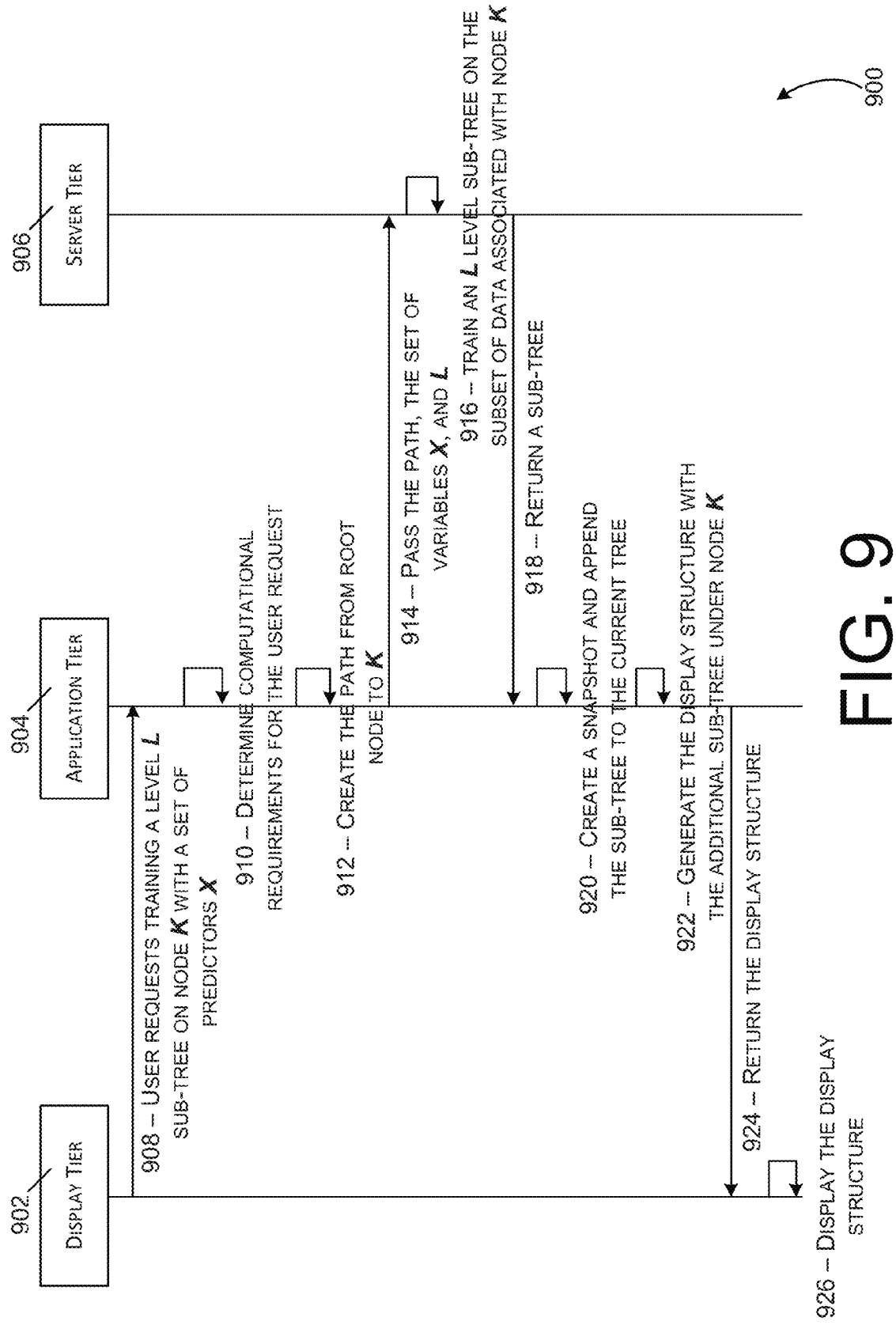
FIG. 9 illustrates an example process for training a level sub-tree of an interactive decision tree, in accordance with at least one embodiment.

FIG. 9 illustrates an example process 900 for training a level sub-tree of an interactive decision tree, in accordance with at least one embodiment. The process 900 may utilize a display tier device 902 (e.g., one of the display tier devices described in connection with FIGS. 3A-3C), an application tier device 904 (e.g., one of the application tier devices described in connection with FIGS. 3A-3C), and a server tier device 906 (e.g., one of the server tier devices described in connection with FIGS. 3A-3C). In at least one example, the display tier device 902 and the application tier device 904 may be the same device.

The process 900 may begin at 908, where a user may request (e.g., via an interaction request) training of a level L sub-tree on a node K using a set of predictor variables X. For example, a user may request a training a level sub-tree on a node using a set of predictor variables by utilizing a graphical user interface (e.g., the graphical user interface of FIG. 20, described below) to identify a node, a set of predictor variables, and a maximum depth value of the sub-tree. The interaction request may include, but is not limited to, interaction request information corresponding to the node K, the set of predictor variables X, and a maximum depth value corresponding to L. The interaction request information may be communicated by the display tier device 902 to the application tier device 904. At 910, the application tier device 904 may execute operations that determine the computational requirements for the interaction request. For example, the application tier device 904 may execute operations that determine that the computational requirements of the interaction request (e.g., a request to train a sub-tree of a node with a set of predictor variables) require multiple pass iterations of the data set D.

At 912, a path may be created from the root node of the decision tree to node K (e.g., utilizing the function Tree.GetPath of FIG. 4). The path, in at least one example, may be used to filter observations of the data set D. The information corresponding to at least the path, the set of predictor variables X, and a maximum depth value corresponding to L may be passed to server tier device 906 at 914.

At 916, the server tier device 906 may execute operations to split a subset of data associated with node K, into two partitions (e.g., utilizing the function ServerTree.Train function of FIG. 4, D, Y, X, L, and the path created at 912). In accordance with at least one embodiment, the server tier device 906 may return a sub-tree at 918. At 920, the application tier device 904, may create a snapshot of the Tree structure (e.g., utilizing the Tree.Previous function of FIG. 4) and may further utilize the data returned at 918 to append the sub-tree data to the current Tree structure (e.g., utilizing the Tree.Append function of FIG. 4). For an update to an existing sub-tree, the sub-tree data of the Tree structure may be updated using the data returned at 918 (e.g., utilizing the Tree.UpdateSubTree function of FIG. 4). A DisplayTree data structure may be generated (e.g., utilizing the function Tree.Display of FIG. 4) at 922 using the Tree structure described at 920. Information corresponding to the generated DisplayTree data structure may be communicated to display tier device 902 at 924. The display tier device 902 may display (e.g., via a thin-client application) a visual representation of the DisplayTree data structure at 926 (e.g., utilizing the graphical user interface of FIG. 20, described below).

Figure 10:
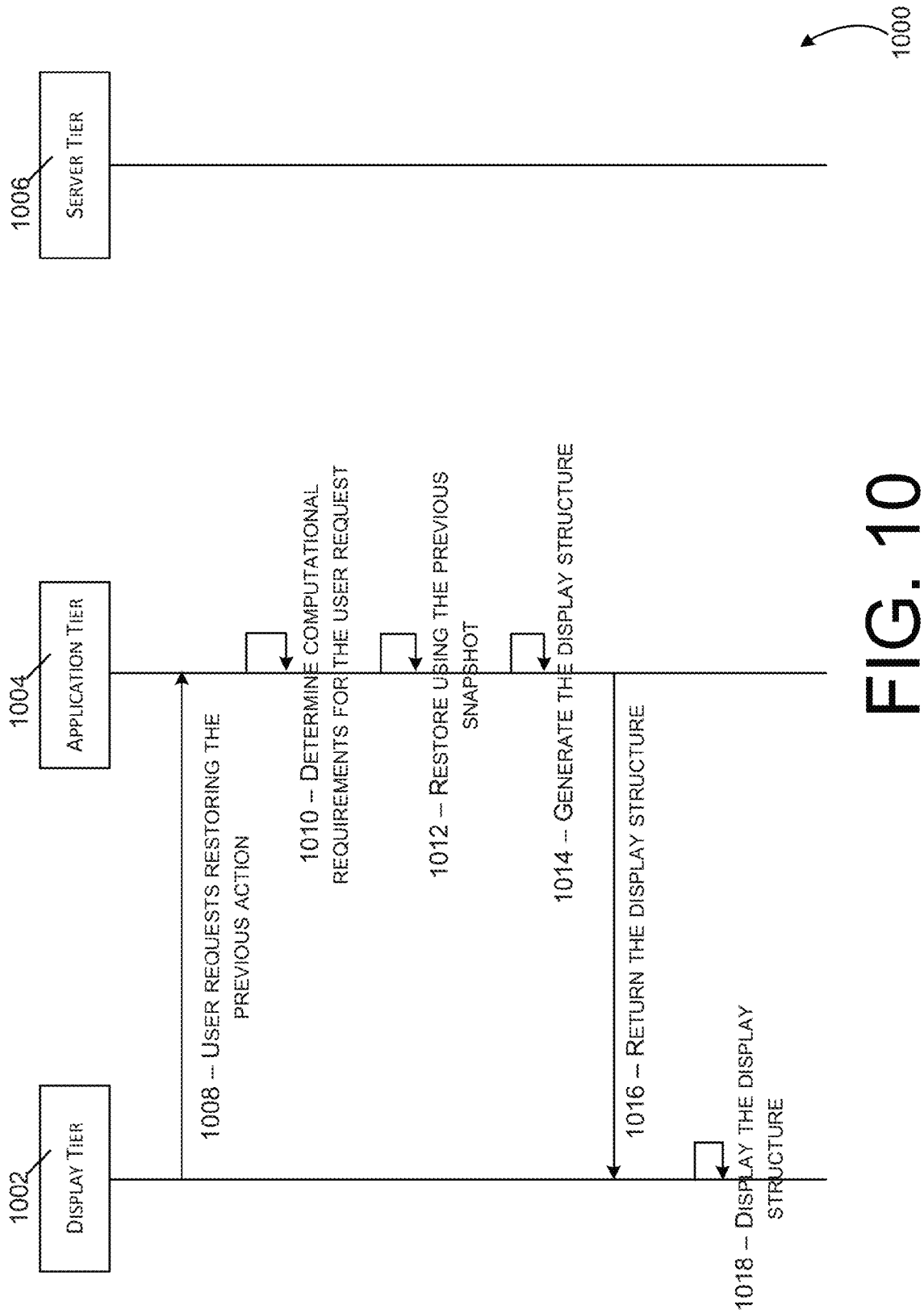
FIG. 10 illustrates an example process for restoring an interactive decision tree, in accordance with at least one embodiment.

FIG. 10 illustrates an example process 1000 for restoring an interactive decision tree, in accordance with at least one embodiment. The process 1000 may utilize a display tier device 1002 (e.g., one of the display tier devices described in connection with FIGS. 3A-3C), an application tier device 1004 (e.g., one of the application tier devices described in connection with FIGS. 3A-3C), and a server tier device 1006 (e.g., one of the server tier devices described in connection with FIGS. 3A-3C). In at least one example, the display tier device 1002 and the application tier device 1004 may be the same device.

The process 1000 may begin at 1008, where a user may request (e.g., via an interaction request) restoring the previous action. For example, a user may request to restore a prior decision tree by utilizing a graphical user interface (e.g., the graphical user interface of FIG. 22, described below). The interaction request may include, but is not limited to, interaction request information corresponding to the display tree. The interaction request information may be communicated by the display tier device 1002 to the application tier device 1004. At 1010, the application tier device 1004 may execute operations that determine the computational requirements for the interaction request. For example, the application tier device 1004 may execute operations that determine that the computational requirements of the interaction request (e.g., a request to restore a previous action) do not require multiple pass iterations of the data set D.

In accordance with at least one embodiment, at 1012, the application tier device 1004 may execute operations to restore a previous snapshot of the decision tree (e.g., utilizing the Tree.Previous function of FIG. 4). A DisplayTree data structure may be generated (e.g., utilizing the function Tree.Display of FIG. 4) at 1014 using the Tree structure described at 1012. Information corresponding to the generated DisplayTree data structure may be communicated to display tier device 1002 at 1016. The display tier device 1002 may display (e.g., via a thin-client application) a visual representation of the DisplayTree data structure at 1018.

Figure 11:
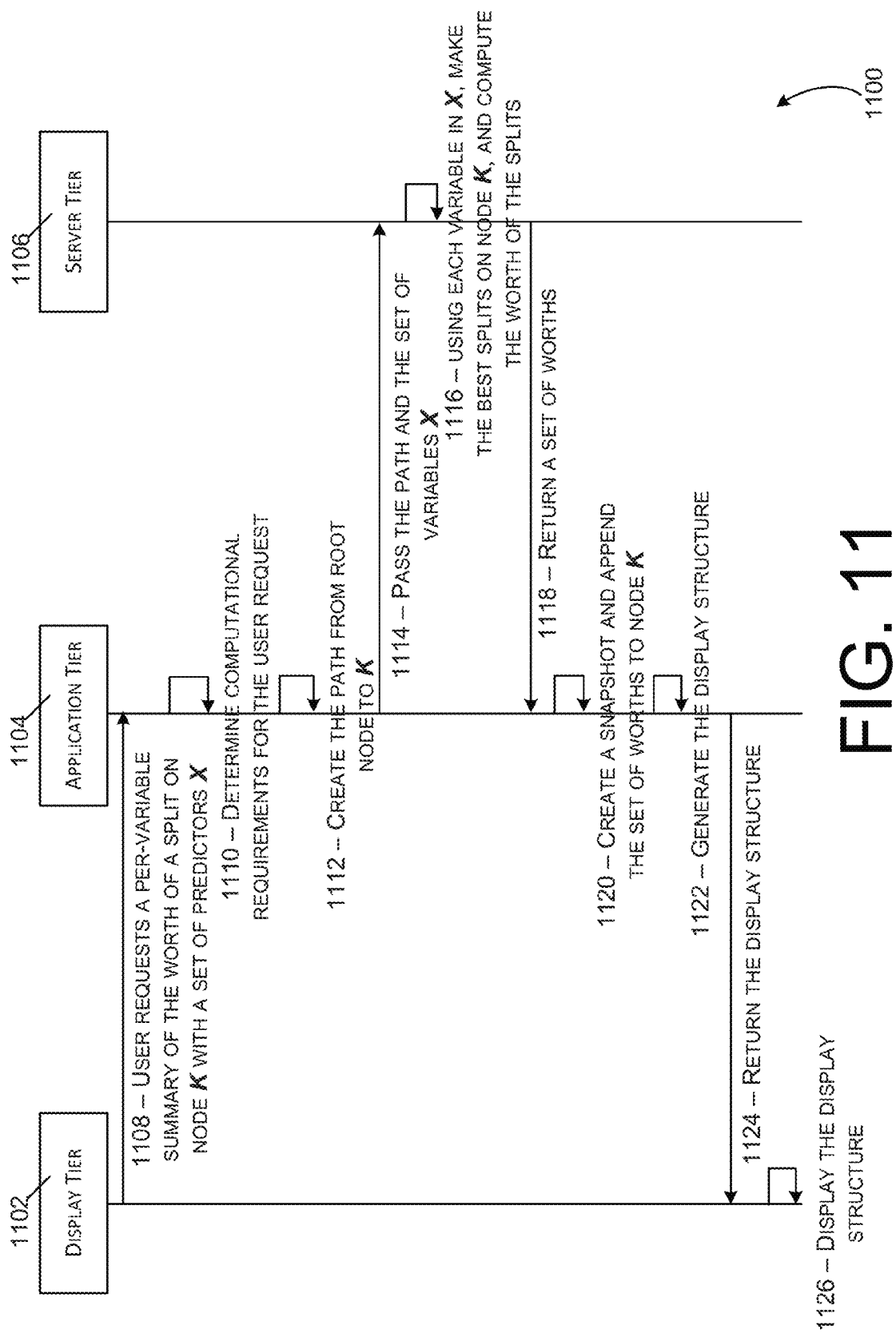
FIG. 11 illustrates an example process for determining a per-variable summary of the worth of a split on a node of an interactive decision tree, in accordance with at least one embodiment.

FIG. 11 illustrates an example process 1100 for determining a per-variable summary of the worth of a split on a node of an interactive decision tree, in accordance with at least one embodiment. The process 1100 may utilize a display tier device 1102 (e.g., one of the display tier devices described in connection with FIGS. 3A-3C), an application tier device 1104 (e.g., one of the application tier devices described in connection with FIGS. 3A-3C), and a server tier device 1106 (e.g., one of the server tier devices described in connection with FIGS. 3A-3C). In at least one example, the display tier device 1102 and the application tier device 1104 may be the same device.

The process 1100 may begin at 1108, where a user may request (e.g., via an interaction request) information related to a worth of a split on a node K related to a set of predictor variables X. The interaction request may include, but is not limited to, interaction request information corresponding to the node K and the set of predictor variables X. The interaction request information may be communicated by the display tier device 1102 to the application tier device 1104. At 1110, the application tier device 1104 may execute operations that determine the computational requirements for the interaction request. For example, the application tier device 1104 may execute operations that determine that the computational requirements of the interaction request (e.g., a request for information related to a worth of a split of a node using a set of predictor variables) require multiple pass iterations of the data set D.

At 1112, a path may be created from the root node of the decision tree to node K (e.g., utilizing the function Tree.GetPath of FIG. 4). The path, in at least one example, may be used to filter observations of the data set D. The information corresponding to at least the path and the set of predictor variables X may be passed to server tier device 1106 at 1114.

At 1116, the server tier device 1106 may execute operations to determine a set of worth values (e.g., utilizing the function ServerTree.GetWorth function of FIG. 4, D, Y, X, L, and the path created at 1112). In accordance with at least one embodiment, the server tier device 1106 may return a set of worth values at 1118. At 1120, the application tier device 1104, may create a snapshot of the Tree structure (e.g., utilizing the Tree.Next function of FIG. 4) and may further utilize the data returned at 1118 to append the data corresponding to the set of worth values to node K (e.g., utilizing the Tree.AppendWorth function of FIG. 4). For an update to an existing sub-tree, the sub-tree data of the Tree structure may be updated using the data returned at 1118 (e.g., utilizing the Tree.UpdateSubTree function of FIG. 4). A DisplayTree data structure may be generated (e.g., utilizing the function Tree.Display of FIG. 4) at 1122 using the Tree structure described at 1120. Information corresponding to the generated DisplayTree data structure may be communicated to display tier device 1102 at 1124. The display tier device 1102 may display (e.g., via a thin-client application) a visual representation of the DisplayTree data structure at 1126 (e.g., utilizing the graphical user interface of FIG. 23, described below).

Figure 12:
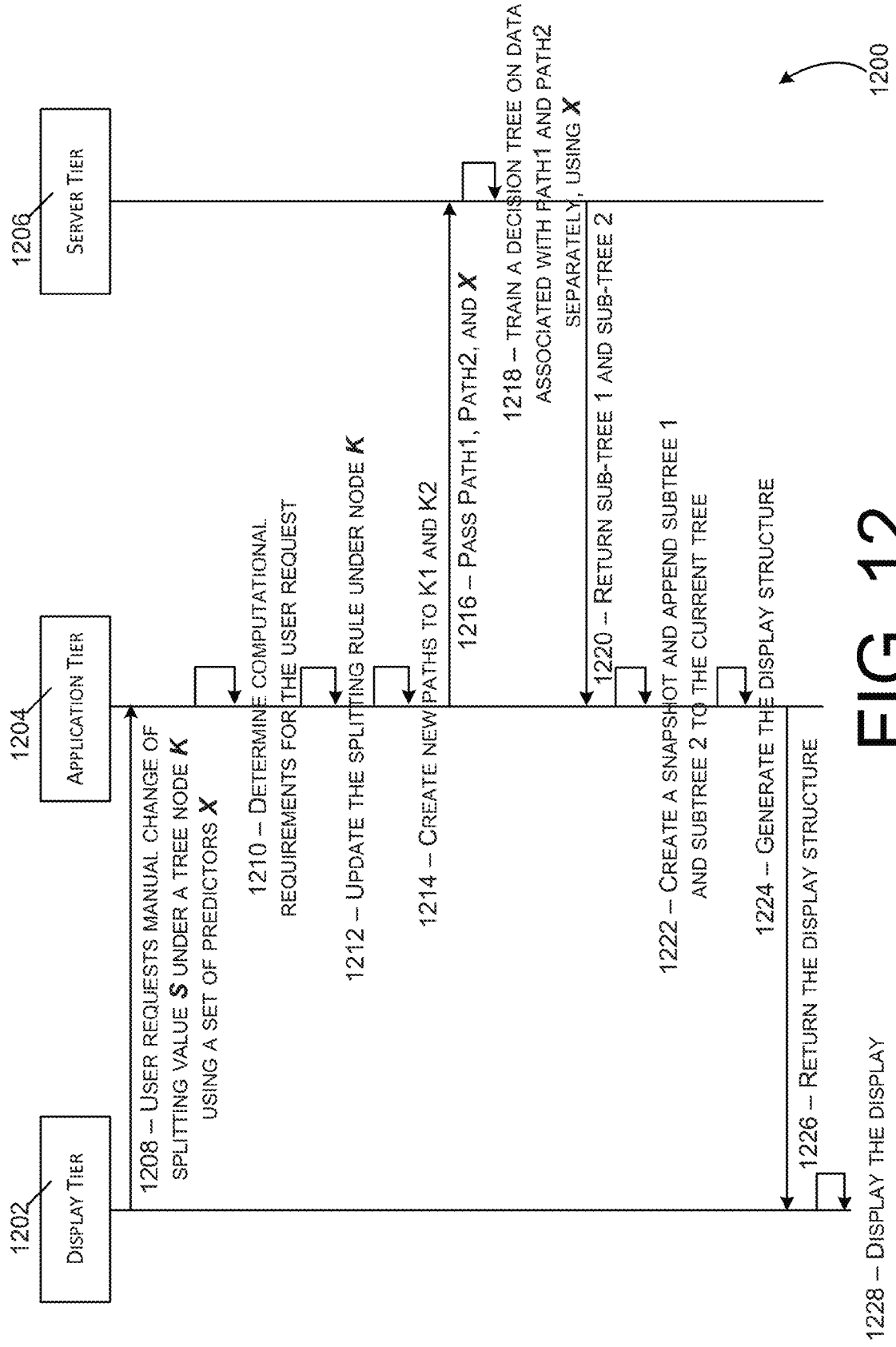
FIG. 12 illustrates an example process for manually changing the splitting value of a node of an interactive decision tree, in accordance with at least one embodiment.

FIG. 12 illustrates an example process 1200 for manually changing the splitting value of a node of a decision tree, in accordance with at least one embodiment. The process 1200 may utilize a display tier device 1202 (e.g., one of the display tier devices described in connection with FIGS. 3A-3C), an application tier device 1204 (e.g., one of the application tier devices described in connection with FIGS. 3A-3C), and a server tier device 1206 (e.g., one of the server tier devices described in connection with FIGS. 3A-3C). In at least one example, the display tier device 1202 and the application tier device 1204 may be the same device.

The process 1200 may begin at 1208, where a user may request (e.g., via an interaction request) a manual change of a splitting value S under a tree node K using a set of predictor variables X. In at least one example, node K may have two child nodes K1 and K2. The interaction request may include, but is not limited to, interaction request information corresponding to the node K, the child nodes K1 and K2, the splitting value S, and the set of predictor variables X. The interaction request information may be communicated by the display tier device 1202 to the application tier device 1204. At 1210, the application tier device 1204 may execute operations that determine the computational requirements of the interaction request. For example, the application tier device 1204 may execute operations that determine that the computational requirements of the interaction request (e.g., a request to manually change the splitting value under a node using a set of predictor variables) require multiple pass iterations of the data set D.

At 1212, the splitting rule stored in the Tree structure may be updated for node K (e.g., utilizing the function Tree.SetSplitValue of FIG. 4). At 1214, new paths may be created from the root node of the decision tree to each of child nodes K1 and K2 (e.g., utilizing the function Tree.GetPath of FIG. 4). The paths, in at least one example, may be used to filter observations of the data set D. The information corresponding to at least the paths and the set of predictor variables X may be passed to server tier device 1206 at 1216.

At 1218, the server tier device 1206 may execute operations to train a decision tree on data associated with the path to K1 (Path 1) and the path to K2 (Path 2) separately, using the set of predictor variables X (e.g., utilizing the function ServerTree.Train function of FIG. 4, D, Y, X, L, Path 1 and Path 2). At 1220, the server tier device 1206 may return a sub-tree corresponding to Path 1 (sub-tree 1) and a sub-tree corresponding to Path 2 (sub-tree 2). At 1222, the application tier device 1204, may create a snapshot of the Tree structure (e.g., utilizing the Tree.Previous function of FIG. 4) and may further utilize the data returned at 1218 to append sub-tree 1 and sub-tree 2 to the current Tree structure (e.g., utilizing the Tree.UpdateSubTree function of FIG. 4). For an update to an existing sub-tree, the sub-tree data of the Tree structure may be updated using the data returned at 1218 (e.g., utilizing the Tree.UpdateSubTree function of FIG. 4). A DisplayTree data structure may be generated (e.g., utilizing the function Tree.Display of FIG. 4) at 1224 using the Tree structure described at 1222. Information corresponding to the generated DisplayTree data structure may be communicated to display tier device 1202 at 1226. The display tier device 1202 may display (e.g., via a thin-client application) a visual representation of the DisplayTree data structure at 1228.

Figure 13:
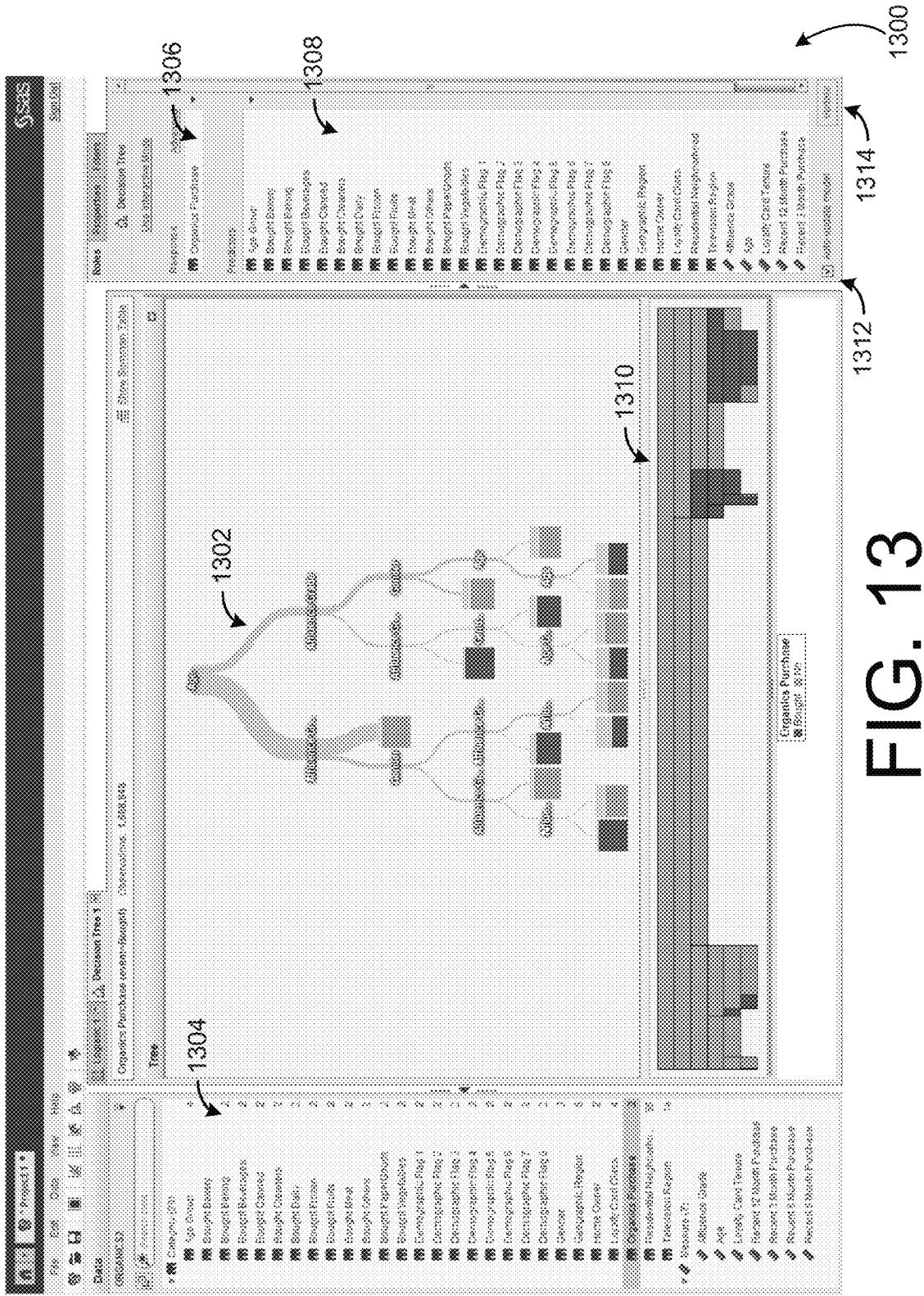
FIG. 13 illustrates an example graphical interface for providing the interactive decision tree, in accordance with at least one embodiment.

FIG. 13 illustrates an example graphical interface 1300 for providing the interactive decision tree, in accordance with at least one embodiment. The data set illustrated in FIGS. 13-23 relates to supermarket shopping. Specifically, the data set includes information indicative of whether or not customers want to purchase organic products. Variables in the data set may relate to recent purchase amount, purchase behavior, demographic information, tenure and information regarding the customer's loyalty card program. In FIGS. 13-23 the shading of the square nodes of the tree represents a dominated level of the node. For example, for a node that 20% of the observations in the data set that had a variable set to a particular value (e.g., Organics Purchase="Yes") and the remaining 80% of the variable set to another value (e.g., Organics Purchase="No", the height of the shading of the square nodes would be 80%. The node shape used in conjunction with the interactive decision tree may be square or may be any suitable shape, image, area, or the like. The shading (e.g., of some portion of the node) may be utilized in a similar manner irrespective of the shape of the node.

The graphical interface 1300 may include a visual representation of an interactive decision tree 1302. The graphical interface 1300 may include a set of variables 1304 included in data set corresponding to the interactive decision tree 1302. A response variable 1306 may be specified utilizing graphical interface 1300. A set of predictor variables 1308 may be included in graphical interface 1300. A data set representation 1310 may be displayed using the graphical interface 1300. The user may select an auto-update indicator 1312 to indicate that he wishes the interactive decision tree 1302 to be updated as he interacts with graphical interface 1300. Alternatively, the user may select an update button 1314 to manually update the interactive decision tree 1302 at a time of his choosing.

Figure 14:
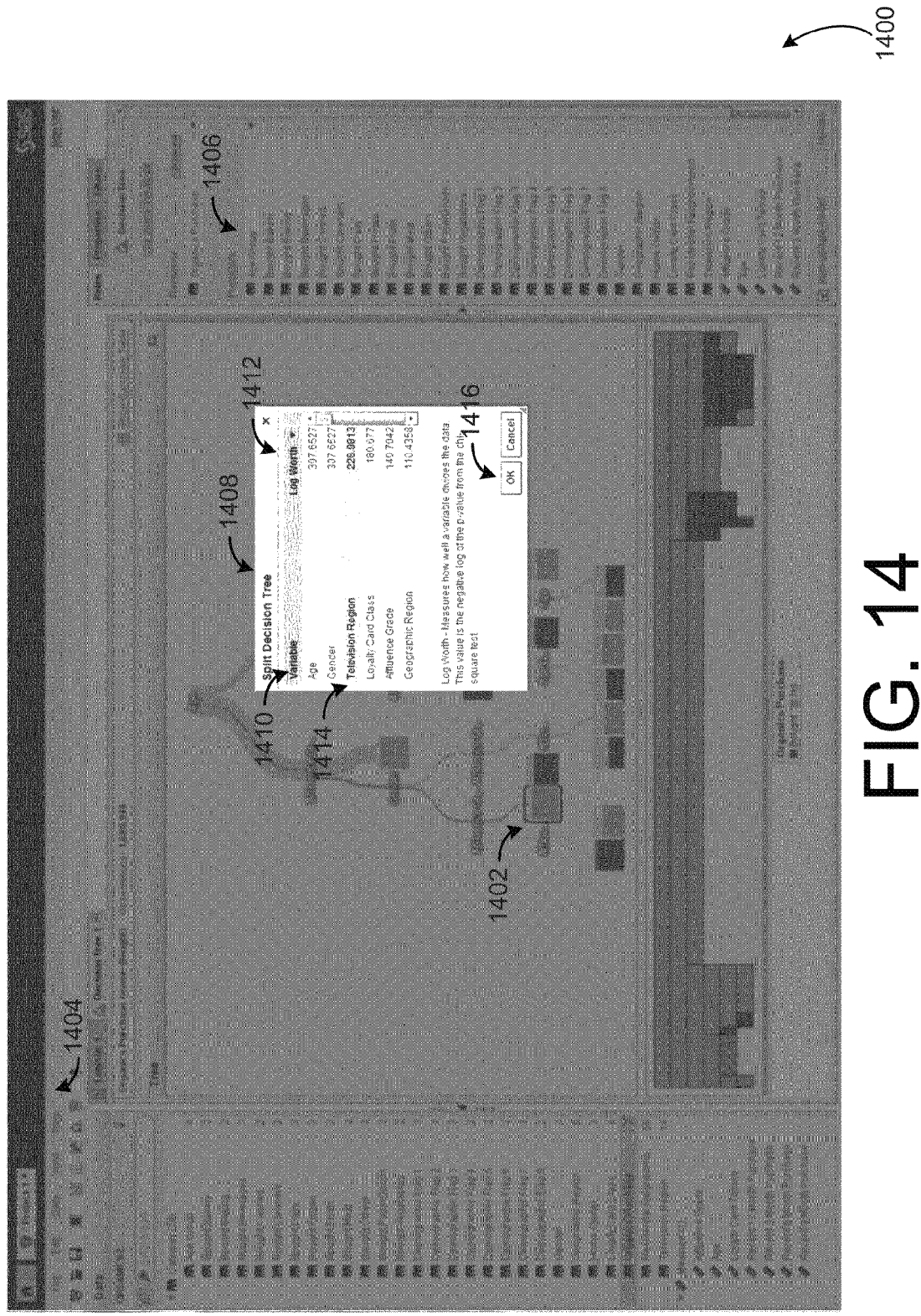
FIG. 14 illustrates an example graphical interface for splitting a node of the interactive decision tree, in accordance with at least one embodiment.

FIG. 14 illustrates an example graphical interface 1400 for splitting a node of the interactive decision tree, in accordance with at least one embodiment. Graphical interface 1400 may be utilized to select a node 1402. For example, the user may select the node 1402 using a left-click of a mouse, using a touchpad to touch the visual representation of node 1402, or any suitable method of selection. Any user selections described herein may utilized similar methods as described in connection with FIG. 14. Upon selection, the user may be presented with an option to split the selected node. Such an option may be presented, for example, via a drop down menu option presented within a threshold distance to the node 1402. Alternatively, the option may be presented via a menu option or sub-menu option included in menu bar 1404. Any options described herein may utilized similar methods as described in connection with FIG. 14.

In accordance with at least one embodiment, upon selection of the option to split the node 1402, information related to splitting the node 1402 using each of a set of predictor variables 1406 may be displayed, for example, via a dialog box 1408. As a non-limiting example, each predictor variable of the set of predictor variables 1406 may be displayed in column 1410 of dialog box 1408. Additionally, a corresponding log worth for each predictor variable may be displayed in column 1412 of dialog box 1408. The user may select a particular predictor variable 1414 (e.g., "Television Region") as the predictor variable with which to split the node 1402. The user may complete the action by selecting the "OK" button 1416.

Figure 15:
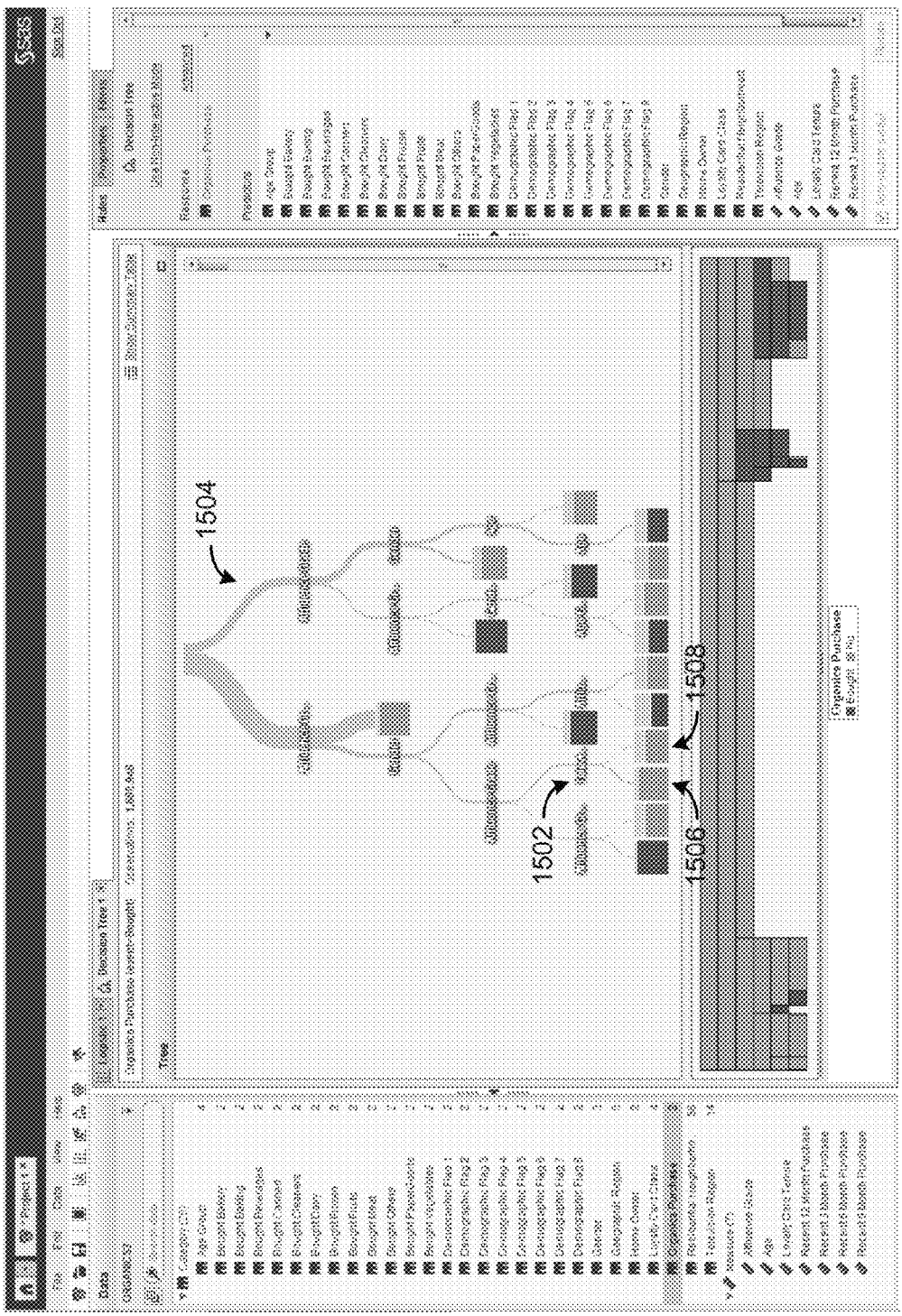
FIG. 15 illustrates an example graphical interface for providing a split of a node of the interactive decision tree, in accordance with at least one embodiment.

FIG. 15 illustrates an example graphical interface 1500 for providing a split of a node 1502 of the interactive decision tree 1504, in accordance with at least one embodiment. Continuing with the example of FIG. 14, upon user selection of a predictor variable with which to split the node 1502 (e.g., node 1402 of FIG. 14), a process for splitting the node of a decision tree may be executed (e.g., the process 600 of FIG. 6). Upon completion of process 600, node 1506 and node 1508 may be displayed as depicted in FIG. 15.

Figure 16:
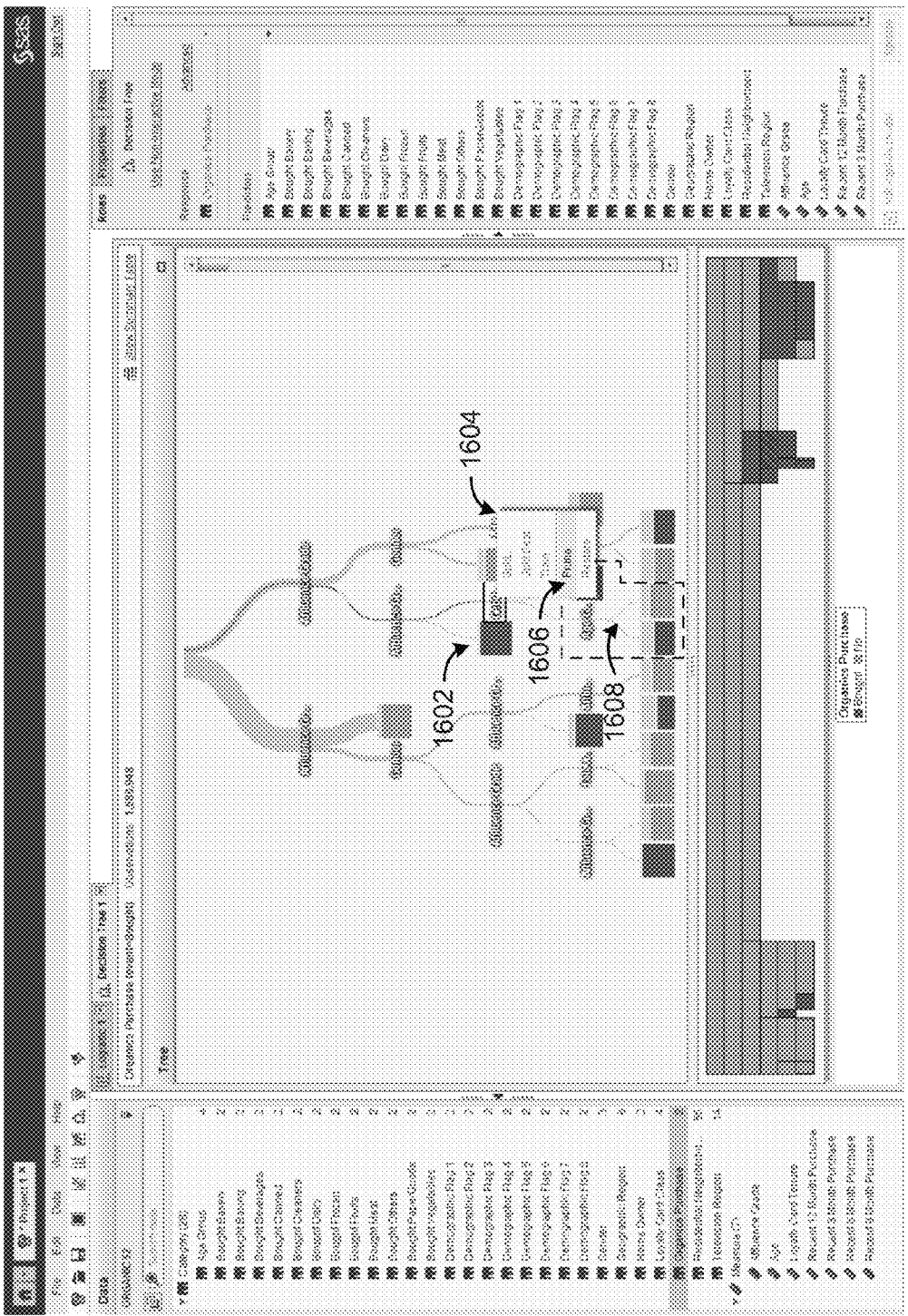
FIG. 16 illustrates an example graphical interface for pruning a node of the interactive decision tree, in accordance with at least one embodiment.

FIG. 16 illustrates an example graphical interface 1600 for pruning a node of the interactive decision tree, in accordance with at least one embodiment. Graphical interface 1600 may be utilized to select a node 1602. Upon selection, the user may be presented with a dialog box 1604 that includes a pruning option 1606. The pruning option 1606 may correspond to sub-tree 1608 (including contents within the dotted line indicated in FIG. 16).

Figure 17:
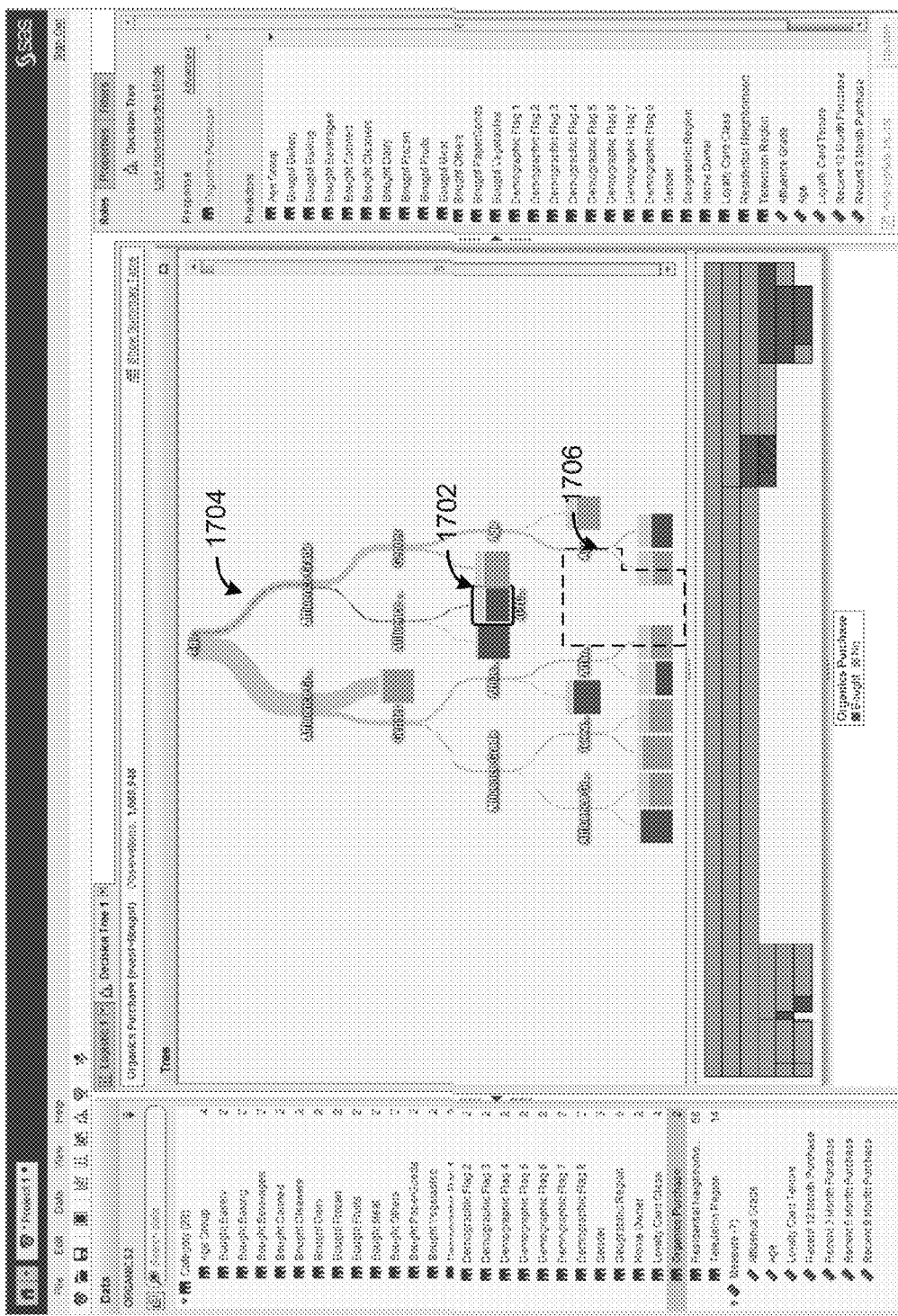
FIG. 17 illustrates an example graphical interface for providing a pruned interactive decision tree, in accordance with at least one embodiment.

FIG. 17 illustrates an example graphical interface 1700 for providing a pruned interactive decision tree, in accordance with at least one embodiment. Continuing with the example of FIG. 16, upon user selection of the pruning option 1606 of FIG. 16, a process for pruning a node 1702 of a decision tree may be executed (e.g., the process 700 of FIG. 7). According to the process 700, sub-tree 1608 of FIG. 16 may be removed from interactive decision tree 1704 as depicted at 1706.

Figure 18:
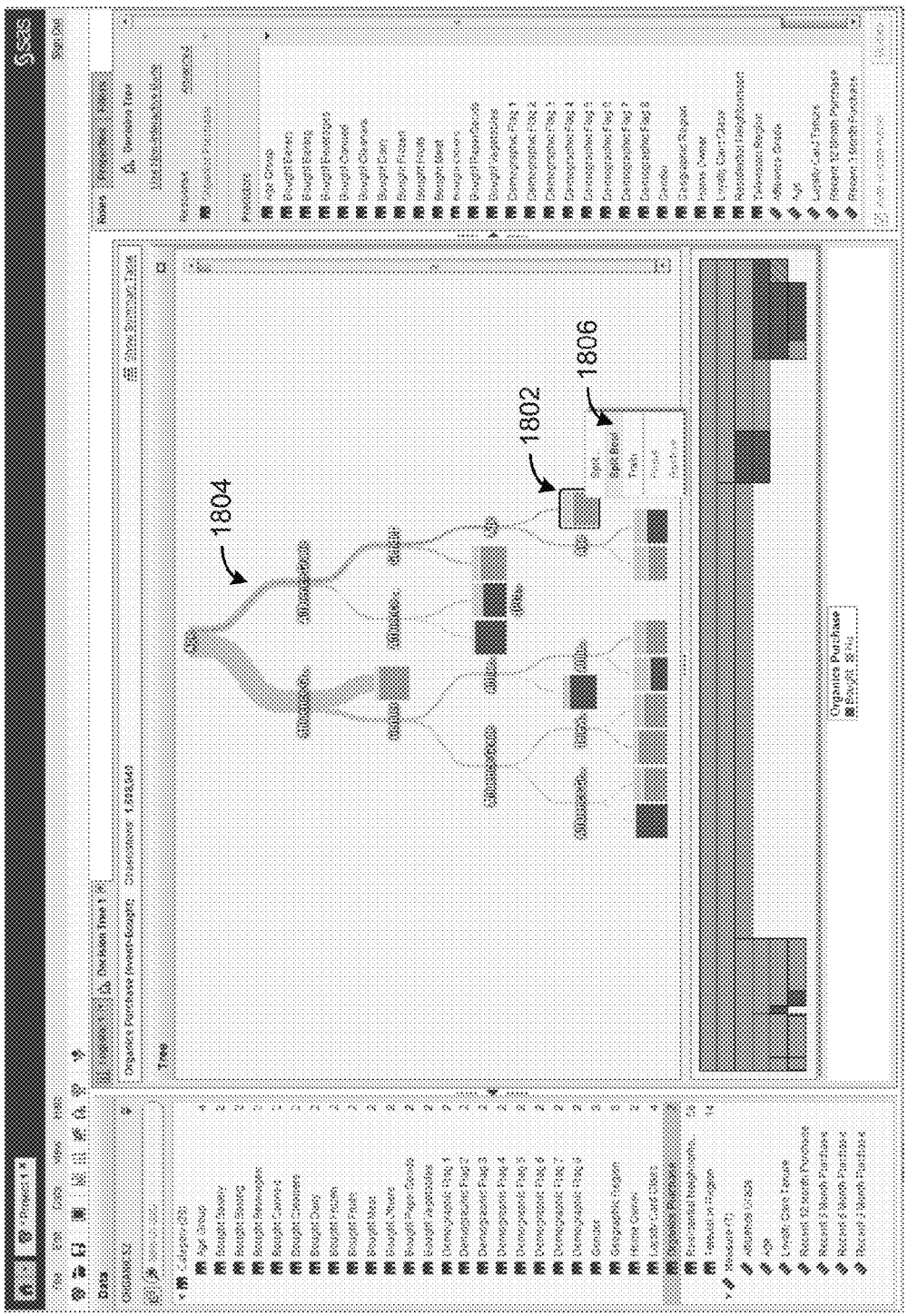
FIG. 18 illustrates an example graphical interface for requesting a best-split of a node of the interactive decision tree, in accordance with at least one embodiment.

FIG. 18 illustrates an example graphical interface 1800 for requesting a best-split of a node 1802 of the interactive decision tree 1804, in accordance with at least one embodiment. Graphical interface 1800 may be utilized to select node 1802. Upon selection, or at another suitable time, the user may be presented with, for example, a split best user option 1806.

Figure 19:
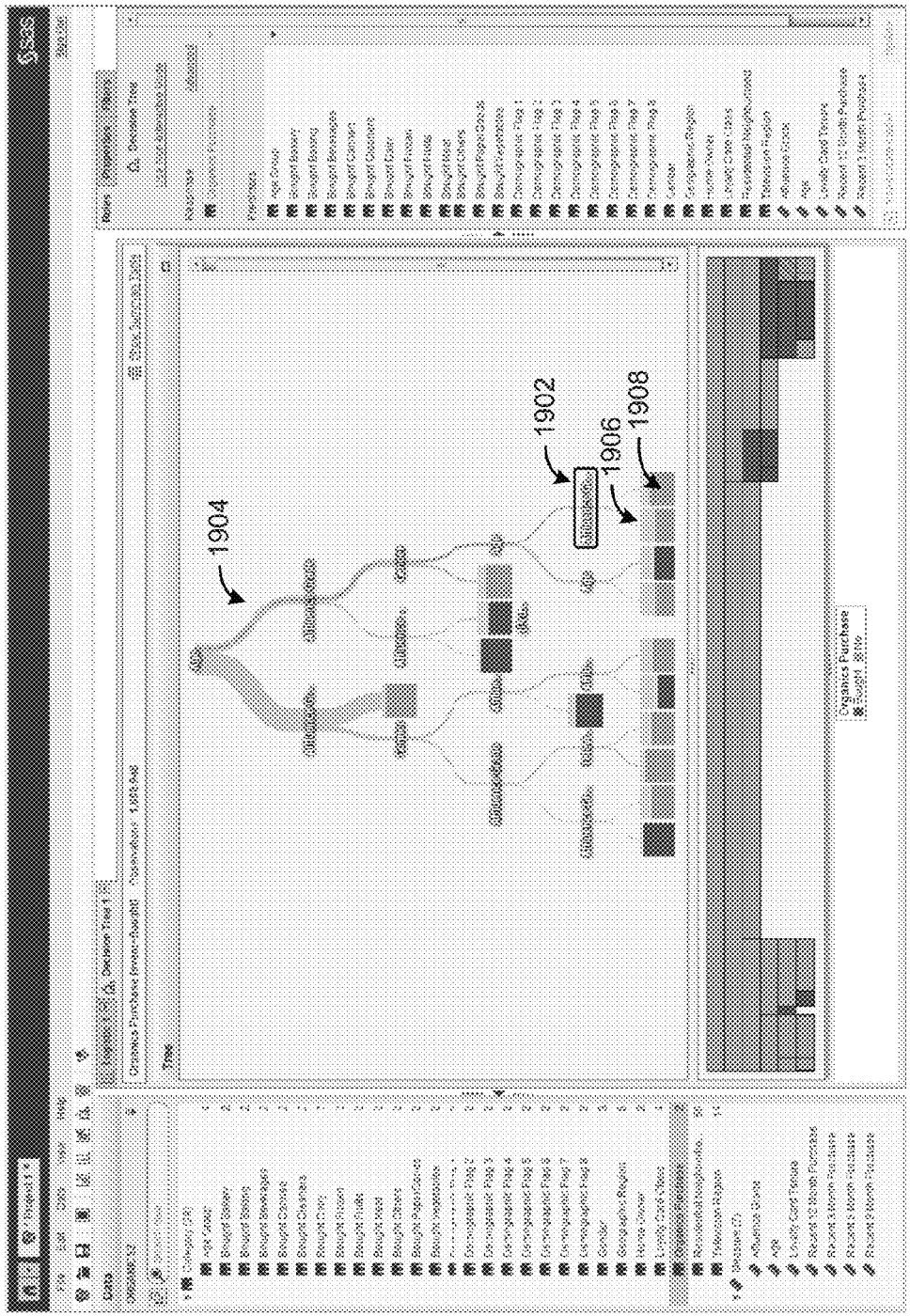
FIG. 19 illustrates an example graphical interface for providing a best-split of a node of the interactive decision tree, in accordance with at least one embodiment.

FIG. 19 illustrates an example graphical interface 1900 for providing a best-split of a node 1902 of the interactive decision tree 1904, in accordance with at least one embodiment. Continuing with the example of FIG. 18, upon user selection of the split best user option 1806 of FIG. 18, a process for determining a best-split of the node 1902 may be executed (e.g., the process 800 of FIG. 8). Upon completion of process 800, node 1906 and node 1908 may be displayed as depicted in FIG. 19.

Figure 20:
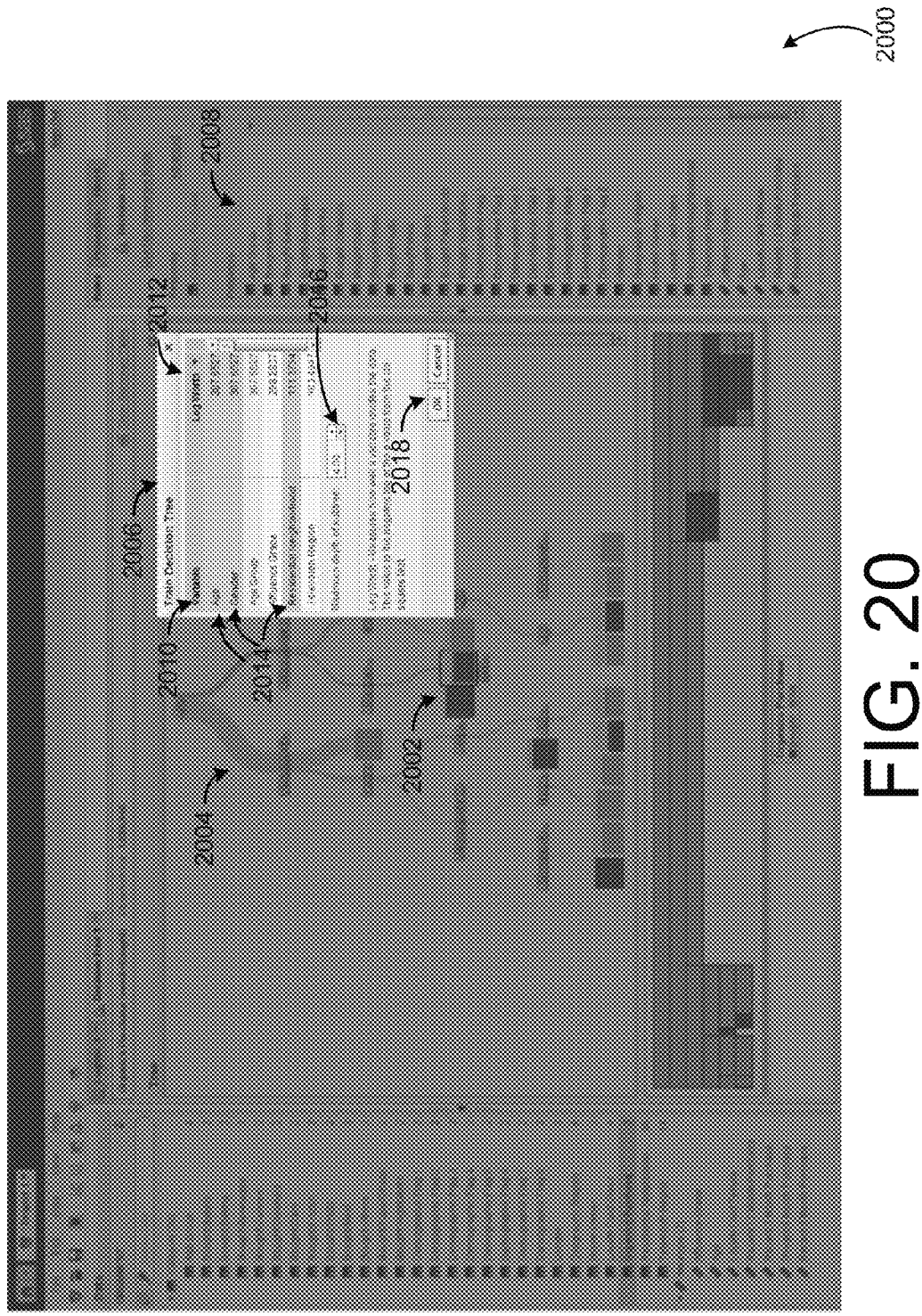
FIG. 20 illustrates an example graphical interface for requesting a trained interactive decision tree, in accordance with at least one embodiment.

FIG. 20 illustrates an example graphical interface 2000 for requesting a trained interactive decision tree, in accordance with at least one embodiment. Upon selection of node 2002 of interactive decision tree 2004, the user may be presented with an option to train a sub-tree of node 2002. Such an option may be presented, for example, via a dialog box 2006. Alternatively, the option may be presented via a menu option or sub-menu option of graphical interface 2000.

In accordance with at least one embodiment, upon selection of the option to train the sub-tree of node 2002, each predictor variable of the set of predictor variables 2008 may be displayed in column 2010 of dialog box 2006. Additionally, a corresponding log worth for each predictor variable may be displayed in column 2012 of dialog box 2006. The user may select a set of predictor variables 2014 (e.g., including predictor variables "Age," "Gender," and "Residential Neighborhood") with which to train the sub-tree of node 2002. The user may specify, for example via selector 2016, a maximum depth value for the trained sub-tree. The user may complete the action by selecting the "OK" button 2018.

Figure 21:
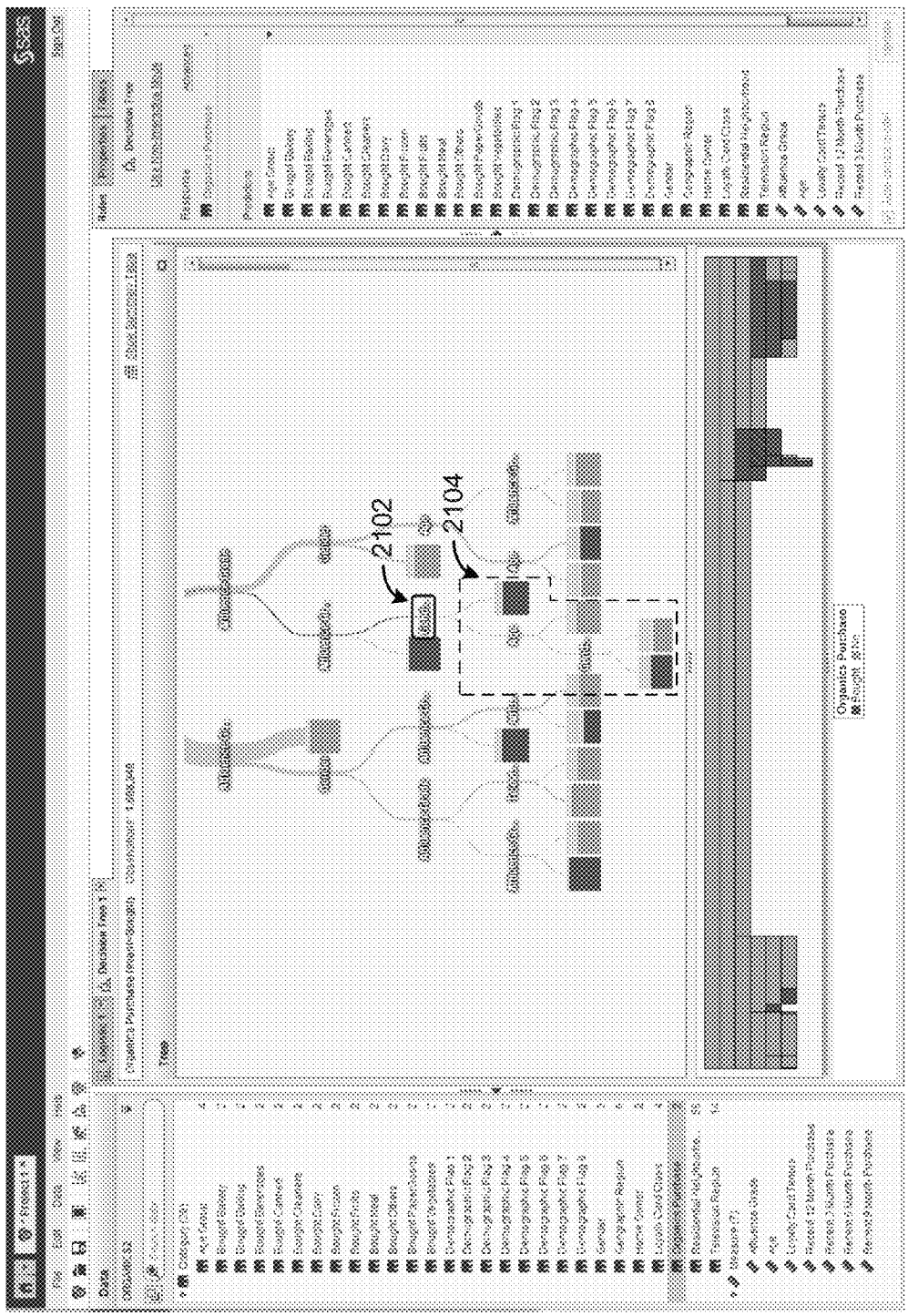
FIG. 21 illustrates an example graphical interface for providing a trained interactive decision tree, in accordance with at least one embodiment.

FIG. 21 illustrates an example graphical interface 2100 for providing a trained interactive decision tree, in accordance with at least one embodiment. Continuing with the example of FIG. 20, upon user selection to train a sub-tree of node 2102 (e.g., the node 2002 of FIG. 20), a process for training a sub-tree may be executed (e.g., the process 900 of FIG. 9). Upon completion of process 900, a returned sub-tree 2104 may be displayed as depicted in FIG. 21.

Figure 22:
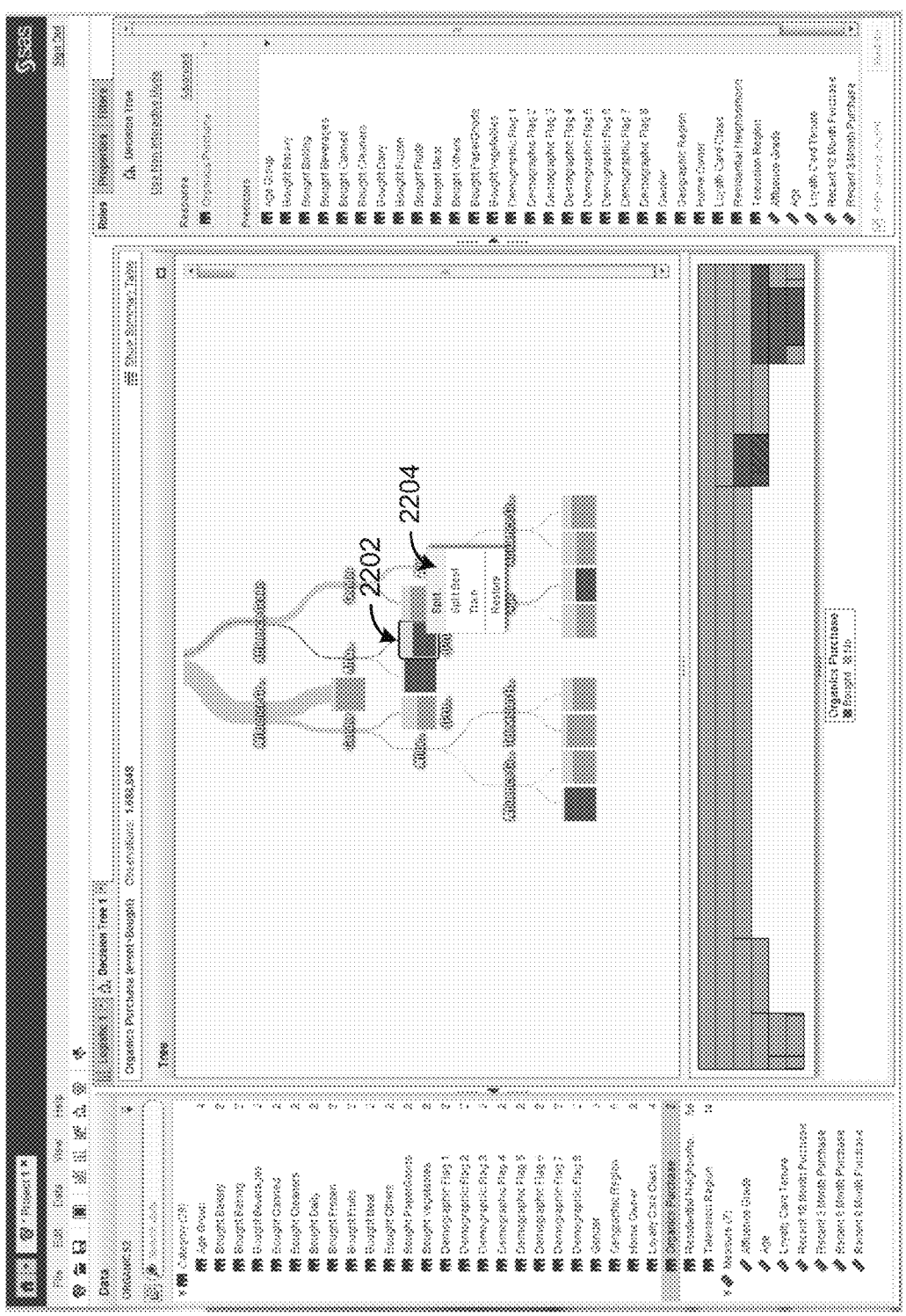
FIG. 22 illustrates an example graphical interface for requesting a summary of the worth of a split of a node of the interactive decision tree, in accordance with at least one embodiment.

FIG. 22 illustrates an example graphical interface 2200 for requesting a summary of the worth of a split of a node 2202 of the interactive decision tree, in accordance with at least one embodiment. Graphical interface 2200 may be utilized to select node 2202. Upon selection, or at another suitable time, the user may be presented with, for example, a split option 2204 corresponding to a request of a summary of the worth of a split of the node 2202 using a set of predictor variables.

Figure 23:
FIG. 23 illustrates an example graphical interface for providing the summary of the worth of a split of a node of the interactive decision tree, in accordance with at least one embodiment.

FIG. 23 illustrates an example graphical interface 2300 for providing the summary of the worth of a split of a node of the interactive decision tree, in accordance with at least one embodiment. Continuing with the example of FIG. 22, upon selection of the option to request a summary of the worth of a split of node (e.g., the node 2202 of FIG. 22), a worth table 2302 may be displayed. As a non-limiting example, one or more predictor variables of the set of predictor variables 2304 may be displayed in column 2306 of worth table 2302. Additionally, a corresponding log worth for each predictor variable may be displayed in column 2308 of worth table 2302.

Figure 24:
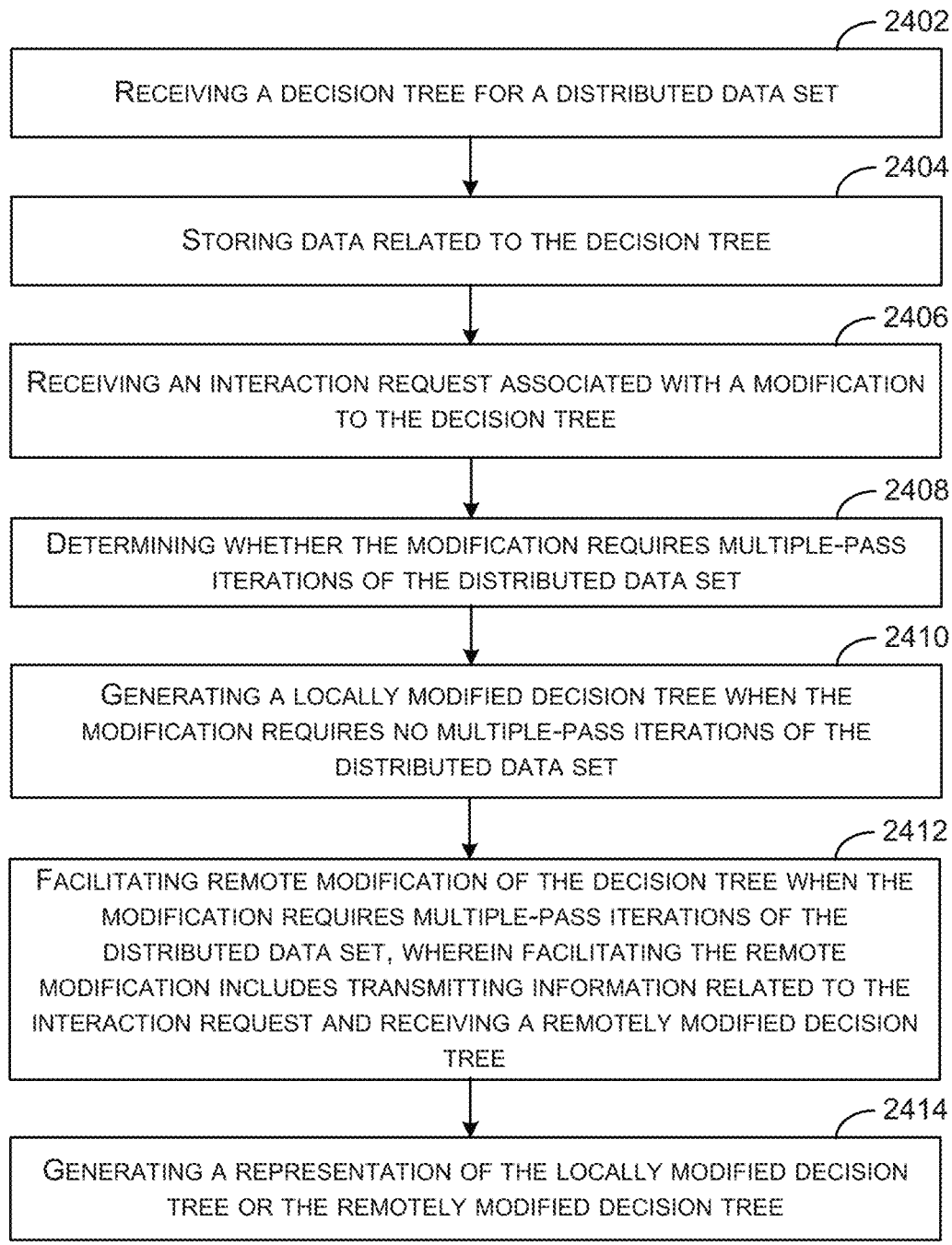
FIG. 24 illustrates an example flow diagram for providing an interactive decision tree using the interactive decision tree engine, in accordance with at least one embodiment.

FIG. 24 illustrates an example flow diagram 2400 for providing an interactive decision tree using the interactive decision tree engine, in accordance with at least one embodiment. The flow may begin at block 2402 where a decision tree for a distributed data set may be received (e.g., by any one of the application tier devices of FIGS. 3A-3C). The received decision tree may have been determined on a device that is not included as an application tier device. The data related to the decision tree may be stored at 2404.

In accordance with at least one embodiment, an interaction request associated with a modification to the decision tree may be received at 2406 (e.g., by the application tier devices of FIGS. 3A-3C). An interaction request may indicate one or more user interactions with graphical interfaces 1300-2300. Further, the interaction request may include user request information including, but not limited to, a data set, a decision tree, one or more nodes of a decision tree, a set of predictor variables, a particular predictor variable, a response variable, one or more paths from a root node of the decision tree to one or more nodes of the decision tree, a splitting value, a maximum depth value, of the like.

At 2408, a determination regarding whether or not the modification requires multiple-processing iterations of the distributed data set may be determined (e.g., by the application tier devices of FIGS. 3A-3C). Multiple-processing iterations is intended to refer to operations that are executed using the data set that are recursive in nature.

At 2410, a locally-modified decision tree may be generated (e.g., by the application tier devices of FIGS. 3A-3C). For example, the locally-modified decision tree may be generated given the determination at 2408 that the modification did not require multiple-processing iterations of the distributed data set.

At 2412, remote modification of the decision tree may be facilitated (e.g., by the application tier devices of FIGS. 3A-3C). As a non-limiting example, facilitating remote modification of the decision tree may include transmitting information related to the interaction request and/or receiving a remotely modified decision tree. Remote modification of the decision tree may be facilitated at 2412 when, for example, the determination at 2408 indicates that the modification requires multiple-processing iterations of the distributed data set.

At 2414, a representation of the locally modified decision tree or the remotely modified decision tree may be generated (e.g., by the application tier devices of FIGS. 3A-3C).

Systems and methods according to some examples may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to, or from, a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, removable memory, flat files, temporary memory, databases, programming data structures, programming variables, IF-THEN (or similar type) statement constructs, etc.). It is noted that data structures may describe formats for use in organizing and storing data in databases, programs, memory, or other computer-readable media for use by a computer program.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows and figures described and shown in this specification can be performed by one or more programmable processors executing one or more computer programs to perform functions by operating on input data and generating output.

Generally, a computer can also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, (e.g., a mobile telephone, a personal digital assistant (PDA), a tablet, a mobile viewing device, a mobile audio player, a Global Positioning System (GPS) receiver), to name just a few. Computer-readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks; magneto optical disks; and CD ROM and DVD-ROM disks). The processor and the memory can be supplemented by, or incorporated in, special purpose logic circuitry.

The computer components, software modules, functions, data stores and data structures described herein may be connected directly or indirectly to each other in order to allow the flow of data needed for their operations. It is also noted that a module or processor includes, but is not limited to, a unit of code that performs a software operation, and can be implemented, for example, as a subroutine unit of code, or as a software function unit of code, or as an object (as in an object-oriented paradigm), or as an applet, or in a computer script language, or as another type of computer code. The software components or functionality may be located on a single computer or distributed across multiple computers depending upon the situation at hand.

The computer may include a programmable machine that performs high-speed processing of numbers, as well as of text, graphics, symbols, and sound. The computer can process, generate, or transform data. The computer includes a central processing unit that interprets and executes instructions; input devices, such as a keyboard, keypad, or a mouse, through which data and commands enter the computer; memory that enables the computer to store programs and data; and output devices, such as printers and display screens, that show the results after the computer has processed, generated, or transformed data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products (i.e., one or more modules of computer program instructions encoded on a computer-readable medium for execution by, or to control the operation of, data processing apparatus). The computer-readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question (e.g., code that constitutes processor firmware, a protocol stack, a graphical system, a database management system, an operating system, or a combination of one or more of them).

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multiple-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

Some aspects may utilize the Internet of Things (IoT), where things (e.g., machines, devices, phones, sensors) can be connected to networks and the data from these things can be collected and processed within the things and/or external to the things. For example, with the IoT there can be sensors in many different devices, and high value analytics can be applied to identify hidden relationships and drive increased efficiencies. This can apply to both Big Data analytics and realtime (streaming) analytics.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A system, comprising:
one or more processors;
one or more computer readable storage mediums comprising instructions to cause the one or more processors to perform operations including:
receiving, by the one or more processors, a decision tree corresponding to a distributed data set;
storing data related to the decision tree, wherein the data includes one or more data structures and one or more portions of code;
receiving input corresponding to a first interaction request associated with a first modification to the decision tree;
determining that the first modification requires no multiple-processing iterations of the distributed data set;
generating an application layer modified decision tree using no multiple-processing iterations of the distributed data set, wherein the application layer modified decision tree is generated using the stored data;
generating a first display layer representation of the application layer modified decision tree;
receiving input corresponding to a second interaction request associated with a second modification to the decision tree;
determining that the second modification requires multiple-processing iterations of the distributed data set;
facilitating server layer modification of the decision tree using multiple-processing iterations of the distributed data set, wherein facilitating the server layer modification includes transmitting information related to the second interaction request and receiving a server layer modified decision tree; and
generating a second display layer representation of the server layer modified decision tree.

2. The system of claim 1, wherein the operations further include:
facilitating a display of the first display layer representation of the application layer modified decision tree or the second display layer representation of the server layer modified decision tree, wherein facilitating the display uses a graphical interface related to the decision tree, wherein the first interaction request or the second interaction request is generated using the graphical interface, and wherein the first display layer representation of the application layer modified decision tree or the second display layer representation of the server layer modified decision tree is provided using the graphical interface.

3. The system of claim 2, wherein the graphical interface is provided using a thin-client application.

4. The system of claim 3, wherein the thin-client application resides on a computing device that is separate from a device including the one or more processors.

5. The system of claim 2, wherein facilitating the display of the graphical interface includes facilitating the display on a plurality of computing devices.

6. The system of claim 2, wherein facilitating the display uses the one or more processors to display the application layer modified decision tree, and wherein facilitating the display uses processors other than the one or more processors to display the server layer modified decision tree.

7. The system of claim 2, wherein an application programming interface is used to facilitate the display of a graphical interface.

8. The system of claim 1, wherein the server layer modified decision tree corresponds to a portion of the decision tree.

9. The system of claim 8, wherein the operations further include:
appending the server layer modified decision tree to the decision tree.

10. The system of claim 8, wherein an application programming interface is used to transmit information related to interaction requests and to receive the server layer modified decision tree.

11. The system of claim 1, wherein the decision tree includes a set of nodes and a set of predictor variables, and wherein facilitating the server layer modification includes:
transmitting node data corresponding to a node;
transmitting predictor variable data corresponding to a predictor variable;
receiving potential node split data corresponding to a potential node split, wherein the potential node split data is generated using the node and the predictor variable; and
associating the potential node split data with the node.

12. The system of claim 1, wherein each multiple-processing iteration of the data set requires one or more reads of the data set.

13. The system of claim 1, wherein the first interaction request or the second interaction request relates to modifying a sub-tree of the decision tree.

14. The system of claim 1, wherein facilitating server layer modification of the decision tree includes calculating a value of worth of a plurality of splits of a node of the decision tree.

15. The system of claim 1, wherein the operations further include:
determining a computational threshold value;
determining a computational requirement corresponding to an interaction request;
generating the application layer modified decision tree when the computational requirement is equal to or less than the computational threshold value; and
facilitating the server layer modification of the decision tree when the computational requirement exceeds the computational threshold value.

16. The system of claim 1, wherein determining that the first modification requires no multiple-processing iterations of the distributed data set or that the second modification requires multiple-processing iterations of the distributed data set includes:
executing a query for the first interaction request or the second interaction request using a data store, wherein the data store contains information related to a plurality of interaction request types and corresponding computational requirements for the plurality of interaction request types, wherein interaction requests correspond to interaction request types; and
receiving information related to a computational requirement for the first interaction request or the second interaction request in response to executing the query.

17. The system of claim 1, wherein the server layer modification of the decision tree is performed using a distributed file system.

18. The system of claim 1, wherein the application layer modified decision tree uses a data structure, and wherein the server layer modification of the decision tree uses a different data structure.

19. The system of claim 1, wherein receiving the information related to the second interaction request at a remote server causes the remote server to perform the second modification of the decision tree to generate the server layer modified decision tree and transmit the server layer modified decision tree.

20. The system of claim 1, wherein the second modification to the decision tree is associated with a particular node of the decision tree, wherein facilitating server layer modification of the decision tree includes determining a path from a root node of the decision tree to the particular node, wherein transmitting information related to the second interaction request includes transmitting the path, and wherein receiving the information related to the second interaction request at a remote server causes the remote server to locate the particular node of the decision tree, perform the second modification of the decision tree to generate the server layer modified decision tree, and transmit the server layer modified decision tree.

21. A non-transitory computer program product, tangibly embodied in a non-transitory machine readable storage medium, including instructions operable to cause a data processing apparatus to perform operations including:
receiving, by a computing device, a decision tree corresponding to a distributed data set;
storing data related to the decision tree, wherein the data includes one or more data structures and one or more portions of code;
receiving input corresponding to a first interaction request associated with a first modification to the decision tree;
determining that the first modification requires no multiple-processing iterations of the distributed data set;
generating an application layer modified decision tree using no multiple-processing iterations of the distributed data set, wherein the application layer modified decision tree is generated using the stored data;
generating a first display layer representation of the application layer modified decision tree;
receiving input corresponding to a second interaction request associated with a second modification to the decision tree;
determining that the second modification requires multiple-processing iterations of the distributed data set;
facilitating server layer modification of the decision tree using multiple-processing iterations of the distributed data set, wherein facilitating the server layer modification includes transmitting information related to the second interaction request and receiving a server layer modified decision tree; and
generating a second display layer representation of the server layer modified decision tree.

22. The non-transitory computer program product of claim 21, wherein receiving the information related to the second interaction request at a remote server causes the remote server to perform the second modification of the decision tree to generate the server layer modified decision tree and transmit the server layer modified decision tree.

23. The non-transitory computer program product of claim 21, wherein the second modification to the decision tree is associated with a particular node of the decision tree, wherein facilitating server layer modification of the decision tree includes determining a path from a root node of the decision tree to the particular node, wherein transmitting information related to the second interaction request includes transmitting the path, and wherein receiving the information related to the second interaction request at a remote server causes the remote server to locate the particular node of the decision tree, perform the second modification of the decision tree to generate the server layer modified decision tree, and transmit the server layer modified decision tree.

24. The non-transitory computer program product of claim 21, wherein the decision tree includes a set of nodes and a set of predictor variables, and wherein facilitating the server layer modification includes:
transmitting node data corresponding to a node;
transmitting predictor variable data corresponding to a predictor variable;
receiving potential node split data corresponding to a potential node split, wherein the potential node split data is generated using the node and the predictor variable; and
associating the potential node split data with the node.

25. The non-transitory computer program product of claim 21, wherein each multiple-processing iteration of the data set requires one or more reads of the data set.

26. The non-transitory computer program product of claim 21, wherein facilitating server layer modification of the decision tree includes calculating a value of worth of a plurality of splits of a node of the decision tree.

27. The non-transitory computer program product of claim 21, wherein the operations further include:
determining a computational threshold value;
determining a computational requirement corresponding to an interaction request;
generating the application layer modified decision tree when the computational requirement is equal to or less than the computational threshold value; and
facilitating the server layer modification of the decision tree when the computational requirement exceeds the computational threshold value.

28. The non-transitory computer program product of claim 21, wherein determining that the first modification requires no multiple-processing iterations of the distributed data set or that the second modification requires multiple-processing iterations of the distributed data set includes:
executing a query for the first interaction request or the second interaction request using a data store, wherein the data store contains information related to a plurality of interaction request types and corresponding computational requirements for the plurality of interaction request types, wherein interaction requests correspond to interaction request types; and
receiving information related to a computational requirement for the first interaction request or the second interaction request in response to executing the query.

29. The non-transitory computer program product of claim 21, wherein the server layer modification of the decision tree is performed using a distributed file system.

30. The non-transitory computer program product of claim 21, wherein the operations further include:
facilitating a display of the first display layer representation of the application layer modified decision tree or the second display layer representation of the server layer modified decision tree, wherein facilitating the display uses a graphical interface related to the decision tree, wherein the first interaction request or the second interaction request is generated using the graphical interface, and wherein the first display layer representation of the application layer modified decision tree or the second display layer representation of the server layer modified decision tree is provided using the graphical interface.

31. The non-transitory computer program product of claim 21, wherein the server layer modified decision tree corresponds to a portion of the decision tree.

32. The non-transitory computer program product of claim 21, wherein the first interaction request or the second interaction request relates to modifying a sub-tree of the decision tree.

33. A computer-implemented method, comprising:
receiving, by one or more processors, a decision tree corresponding to a distributed data set
storing data related to the decision tree, wherein the data includes one or more data structures and one or more portions of code;
receiving input corresponding to a first interaction request associated with a first modification to the decision tree;
determining that the first modification requires no multiple-processing iterations of the distributed data set;
generating an application layer modified decision tree using no multiple-processing iterations of the distributed data set, wherein the application layer modified decision tree is generated using the stored data;
generating a first display layer representation of the application layer modified decision tree;
receiving input corresponding to a second interaction request associated with a second modification of the distributed data set;
determining that the second modification requires multiple-processing iterations of the distributed data set;
facilitating server layer modification of the decision tree using multiple-processing iterations of the distributed data set, wherein facilitating the server layer modification includes transmitting information related to the second interaction request and receiving a server layer modified decision tree; and
generating a second display layer representation of the server layer modified decision tree.

34. The computer-implemented method of claim 33, further comprising:
facilitating a display of the first display layer representation of the application layer modified decision tree or the second display layer representation of the server layer modified decision tree, wherein facilitating the display uses a graphical interface related to the decision tree, wherein the first interaction request or the second interaction request is generated using the graphical interface, and wherein the first display layer representation of the application layer modified decision tree or the second display layer representation of the server layer modified decision tree is provided using the graphical interface.

35. The computer-implemented method of claim 33, wherein the server layer modified decision tree corresponds to a portion of the decision tree.

36. The computer-implemented method of claim 33, wherein the decision tree includes a set of nodes and a set of predictor variables, and wherein facilitating the server layer modification includes:
transmitting node data corresponding to a node;
transmitting predictor variable data corresponding to a predictor variable;
receiving potential node split data corresponding to a potential node split, wherein the potential node split data is generated using the node and the predictor variable; and
associating the potential node split data with the node.

37. The computer-implemented method of claim 33, wherein each multiple-processing iteration of the data set requires one or more reads of the data set.

38. The computer-implemented method of claim 33, wherein the first interaction request or the second interaction request relates to modifying a sub-tree of the decision tree.

39. The computer-implemented method of claim 33, wherein facilitating server layer modification of the decision tree includes calculating a value of worth of a plurality of splits of a node of the decision tree.

40. The computer-implemented method of claim 33, further comprising:
   determining a computational threshold value;
   determining a computational requirement corresponding to an interaction request;
   generating the application layer modified decision tree when the computational requirement is equal to or less than the computational threshold value; and
   facilitating the server layer modification of the decision tree when the computational requirement exceeds the computational threshold value.

41. The computer-implemented method of claim 33, wherein determining that the first modification requires no multiple-processing iterations of the distributed data set or that the second modification requires multiple-processing iterations of the distributed data set includes:
   executing a query for the first interaction request or the second interaction request using a data store, wherein the data store contains information related to a plurality of interaction request types and corresponding computational requirements for the plurality of interaction request types, wherein interaction requests correspond to interaction request types; and
   receiving information related to a computational requirement for the first interaction request or the second interaction request in response to executing the query.

42. The computer-implemented method of claim 33, wherein the server layer modification of the decision tree is performed using a distributed file system.

43. The computer-implemented method of claim 33, wherein receiving the information related to the second interaction request at a remote server causes the remote server to perform the second modification of the decision tree to generate the server layer modified decision tree and transmit the server layer modified decision tree.

44. The computer-implemented method of claim 33, wherein the second modification to the decision tree is associated with a particular node of the decision tree, wherein facilitating server layer modification of the decision tree includes determining a path from a root node of the decision tree to the particular node, wherein transmitting information related to the second interaction request includes transmitting the path, and wherein receiving the information related to the second interaction request at a remote server causes the remote server to locate the particular node of the decision tree, perform the second modification of the decision tree to generate the server layer modified decision tree, and transmit the server layer modified decision tree.

* * * * *